US012783843B2

(12) United States Patent
Narendra et al.

(10) Patent No.: US 12,783,843 B2
(45) **Date of Patent: *Nov. 3, 2026**

(54) METHOD AND APPARATUS FOR TRANSMITTING DATA VIA NFC FOR MOBILE APPLICATIONS INCLUDING MOBILE PAYMENTS AND TICKETING

(71) Applicant: iCashe, Inc., Portland, OR (US)

(72) Inventors: Siva G. Narendra, Portland, OR (US); Saurav Chakraborty, West Bengal (IN); Prabhakar Tadepalli, Bangalore (IN)

(73) Assignee: iCashe, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/949,318

(22) Filed: Nov. 15, 2024

(65) Prior Publication Data

US 2025/0139398 A1 May 1, 2025

Related U.S. Application Data

(63) Continuation of application No. 18/317,917, filed on May 15, 2023, now Pat. No. 12,147,863, which is a (Continued)

(51) Int. Cl.
*G08B 13/14* (2006.01)
*G06K 19/07* (2006.01)

(Continued)

(52) U.S. Cl.
CPC ..... *G06K 19/0727* (2013.01); *G06K 19/0701* (2013.01); *G06K 19/0715* (2013.01);

(Continued)

(58) Field of Classification Search
CPC ........... G06K 19/0727; G06K 19/0701; G06K 19/0715; G06K 19/0723; G06K 19/0726;

(Continued)

(56) References Cited

U.S. PATENT DOCUMENTS 4,701,601 A 10/1987 Francini et al.
4,786,791 A 11/1988 Hodama (Continued)

FOREIGN PATENT DOCUMENTS

DE 3632294 A1 4/1988
DE 10028813 A1 12/2001

(Continued)

OTHER PUBLICATIONS

Notice of Allowance notified Jul. 17, 2024 for U.S. Appl. No. 18/317,917.

(Continued)

*Primary Examiner* — Toan N Pham
(74) *Attorney, Agent, or Firm* — MUGHAL GAUDRY & FRANKLIN PC

(57) ABSTRACT

A mobile device includes a smartcard controller that does not rely on power received from an interrogating RF field. The mobile device also includes a small inductive device capable of inductive coupling with an RFID reader. The smartcard controller includes circuitry to modulate an impedance of a port coupled to the inductive element when in the presence of an interrogating RF field at substantially 13.56 MHz.

19 Claims, 30 Drawing Sheets

Related U.S. Application Data continuation of application No. 17/179,237, filed on Feb. 18, 2021, now Pat. No. 11,694,053, which is a continuation of application No. 16/791,609, filed on Feb. 14, 2020, now Pat. No. 10,949,726, which is a continuation of application No. 16/393,275, filed on Apr. 24, 2019, now Pat. No. 10,607,129, which is a continuation of application No. 15/904,328, filed on Feb. 24, 2018, now Pat. No. 10,318,855, which is a continuation of application No. 15/338,436, filed on Oct. 30, 2016, now Pat. No. 9,904,887, which is a continuation of application No. 14/517,585, filed on Oct. 17, 2014, now Pat. No. 9,489,608, which is a continuation of application No. 14/460,647, filed on Aug. 15, 2014, now Pat. No. 8,937,549, which is a continuation of application No. 13/871,849, filed on Apr. 26, 2013, now Pat. No. 8,866,614, which is a continuation of application No. 13/038,341, filed on Mar. 1, 2011, now Pat. No. 8,451,122, which is a continuation-in-part of application No. 12/188,346, filed on Aug. 8, 2008, now Pat. No. 7,961,101.

(51) Int. Cl.
*G06K 19/073* (2006.01)
*G06K 19/077* (2006.01)
*G06Q 20/20* (2012.01)
*G06Q 20/32* (2012.01)
*H04B 1/3816* (2015.01)
*H04B 5/70* (2024.01)
*H04B 5/77* (2024.01)

(52) U.S. Cl.
CPC ..... *G06K 19/0723* (2013.01); *G06K 19/0726* (2013.01); *G06K 19/073* (2013.01); *G06K 19/07732* (2013.01); *G06K 19/07749* (2013.01); *G06K 19/07769* (2013.01); *G06Q 20/204* (2013.01); *G06Q 20/3278* (2013.01); *H04B 1/3816* (2013.01); *H04B 5/70* (2024.01); *H04B 5/77* (2024.01); *Y02D 30/70* (2020.08)

(58) Field of Classification Search
CPC ........... G06K 19/073; G06K 19/07732; G06K 19/07749; G06K 19/07769; G06Q 20/204; G06Q 20/3278; G06Q 20/34; G06Q 20/341; H04B 1/3816; H04B 5/70; H04B 5/77; Y02D 30/70; G07F 7/0873; H04Q 2209/47; H04Q 2213/13095; H04Q 3/0025
See application file for complete search history.

(56) References Cited

U.S. PATENT DOCUMENTS

| | | | |
|---|---|---|---|
| 4,791,283 | A | 12/1988 | Burkhardt |
| 4,864,109 | A | 9/1989 | Minematsu et al. |
| 5,212,478 | A | 5/1993 | Moseley |
| 5,378,887 | A | 1/1995 | Kobayashi |
| 5,386,106 | A | 1/1995 | Kumar |
| 5,537,584 | A | 7/1996 | Miyai et al. |
| 5,574,273 | A | 11/1996 | Nakagawa et al. |
| 5,585,787 | A | 12/1996 | Wallerstein |
| 5,629,981 | A | 5/1997 | Nerlikar |
| 5,700,037 | A | 12/1997 | Keller |
| 5,710,421 | A | 1/1998 | Kokubu |
| 5,834,756 | A | 11/1998 | Gutman et al. |
| 5,909,491 | A | 6/1999 | Luo |
| 5,940,510 | A | 8/1999 | Curry et al. |
| 5,949,880 | A | 9/1999 | Curry et al. |
| 5,952,641 | A | 9/1999 | Korshun |
| 5,955,961 | A | 9/1999 | Wallerstein |
| 6,016,476 | A | 1/2000 | Maes et al. |
| 6,021,944 | A | 2/2000 | Arakaki |
| 6,039,260 | A | 3/2000 | Eisele |
| 6,045,043 | A | 4/2000 | Bashan et al. |
| 6,068,184 | A | 5/2000 | Barnett |
| 6,105,013 | A | 8/2000 | Curry et al. |
| 6,182,891 | B1 | 2/2001 | Furuhashi et al. |
| 6,189,786 | B1 | 2/2001 | Itou et al. |
| 6,206,293 | B1 | 3/2001 | Gutman et al. |
| 6,219,439 | B1 | 4/2001 | Burger |
| 6,223,954 | B1 | 5/2001 | Carow |
| 6,223,984 | B1 | 5/2001 | Renner et al. |
| 6,237,095 | B1 | 5/2001 | Curry et al. |
| 6,250,557 | B1 | 6/2001 | Forslund et al. |
| 6,315,195 | B1 | 11/2001 | Ramachandran |
| 6,402,029 | B1 | 6/2002 | Gangi |
| 6,450,407 | B1 | 9/2002 | Freeman et al. |
| 6,481,623 | B1 | 11/2002 | Grant et al. |
| 6,568,600 | B1 | 5/2003 | Carpier et al. |
| 6,588,660 | B1 | 7/2003 | Buescher et al. |
| 6,592,044 | B1 | 7/2003 | Wong et al. |
| 6,594,759 | B1 | 7/2003 | Wang |
| 6,598,031 | B1 | 7/2003 | Ice |
| 6,607,127 | B2 | 8/2003 | Wong |
| 6,609,654 | B1 | 8/2003 | Anderson et al. |
| 6,631,849 | B2 | 10/2003 | Blossom |
| 6,636,833 | B1 | 10/2003 | Flitcroft et al. |
| 6,658,516 | B2 | 12/2003 | Yao |
| 6,669,487 | B1 | 12/2003 | Nishizawa et al. |
| 6,705,520 | B1 | 3/2004 | Pitroda et al. |
| 6,712,277 | B2 | 3/2004 | Spencer |
| 6,715,679 | B1 | 4/2004 | Infosino |
| 6,721,196 | B1 | 4/2004 | Grassl |
| 6,747,547 | B2 | 6/2004 | Benson |
| 6,764,005 | B2 | 7/2004 | Cooper |
| 6,769,607 | B1 | 8/2004 | Pitroda et al. |
| 6,805,288 | B2 | 10/2004 | Routhenstein et al. |
| 6,811,082 | B2 | 11/2004 | Wong |
| 6,836,843 | B2 | 12/2004 | Seroussi et al. |
| 6,839,772 | B1 | 1/2005 | Kowalski et al. |
| 6,857,566 | B2 | 2/2005 | Wankmueller |
| 6,882,900 | B1 | 4/2005 | Terranova |
| 6,883,718 | B1 | 4/2005 | Le et al. |
| 6,905,072 | B2 | 6/2005 | Ramachandran |
| 6,907,123 | B1 | 6/2005 | Schier |
| 6,908,030 | B2 | 6/2005 | Rajasekaran et al. |
| 6,925,568 | B1 | 8/2005 | Heinonen |
| 6,937,526 | B2 | 8/2005 | Furukawa |
| 6,952,788 | B2 | 10/2005 | Rommelmann et al. |
| 6,995,651 | B2 | 2/2006 | Amtmann et al. |
| 7,059,520 | B1 | 6/2006 | Shtesl |
| 7,088,246 | B2 | 8/2006 | Fukuoka |
| 7,185,146 | B2 | 2/2007 | Masuyama et al. |
| 7,213,766 | B2 | 5/2007 | Ryan et al. |
| 7,221,473 | B2 | 5/2007 | Jeran et al. |
| 7,281,101 | B2 | 10/2007 | Mizushima et al. |
| 7,295,790 | B2 | 11/2007 | Morimoto et al. |
| 7,333,062 | B2 | 2/2008 | Leizerovich et al. |
| 7,350,717 | B2 | 4/2008 | Conner et al. |
| 7,353,993 | B2 | 4/2008 | Fujimoto |
| 7,410,102 | B2 | 8/2008 | Winkler |
| 7,493,484 | B2 | 2/2009 | Lee |
| 7,558,107 | B2 | 7/2009 | Sakurai et al. |
| 7,558,110 | B2 | 7/2009 | Mizushima et al. |
| 7,581,678 | B2 | 9/2009 | Narendra et al. |
| 7,607,580 | B2 | 10/2009 | Takita et al. |
| 7,673,080 | B1 | 3/2010 | Yu et al. |
| RE41,352 | E | 5/2010 | Wood, Jr. |
| 7,716,082 | B1 | 5/2010 | Blalock |
| RE41,471 | E | 8/2010 | Wood, Jr. |
| 7,789,303 | B2 | 9/2010 | Fukasawa |
| 7,792,516 | B2 | 9/2010 | Soderstrom |
| 7,828,214 | B2 | 11/2010 | Narendra et al. |
| RE42,254 | E | 3/2011 | Wood, Jr. |
| 7,898,994 | B2 | 3/2011 | Zhao et al. |
| 7,933,571 | B2 | 4/2011 | Black et al. |
| 7,941,197 | B2 | 5/2011 | Jain et al. |

(56) References Cited

U.S. PATENT DOCUMENTS

| | | | |
|---|---|---|---|
| 7,948,356 | B2 | 5/2011 | Kawamura et al. |
| 7,954,715 | B2 | 6/2011 | Narendra et al. |
| 7,954,716 | B2 | 6/2011 | Narendra et al. |
| 7,954,717 | B2 | 6/2011 | Narendra et al. |
| 7,961,101 | B2 | 6/2011 | Narendra et al. |
| 7,991,158 | B2 | 8/2011 | Narendra et al. |
| 8,072,331 | B2 | 12/2011 | Narendra et al. |
| 8,082,575 | B2 | 12/2011 | Doughty et al. |
| 8,083,145 | B2 | 12/2011 | Narendra et al. |
| 8,091,786 | B2 | 1/2012 | Narendra et al. |
| 8,103,881 | B2 | 1/2012 | Doughty et al. |
| 10,121,140 | B2 | 11/2018 | Sperduti et al. |
| 12,147,863 | B2 * | 11/2024 | Narendra ........... G06K 19/0727 |
| 2001/0001035 | A1 | 5/2001 | McLuen et al. |
| 2001/0002035 | A1 | 5/2001 | Kayanakis |
| 2001/0006902 | A1 | 7/2001 | Ito |
| 2001/0013551 | A1 | 8/2001 | Ramachandran |
| 2001/0034246 | A1 | 10/2001 | Hutchison et al. |
| 2002/0007434 | A1 | 1/2002 | Campardo |
| 2002/0025796 | A1 | 2/2002 | Taylor et al. |
| 2002/0043566 | A1 | 4/2002 | Goodman et al. |
| 2002/0044043 | A1 | 4/2002 | Chaco et al. |
| 2002/0095588 | A1 | 7/2002 | Shigematsu et al. |
| 2002/0096570 | A1 | 7/2002 | Wong et al. |
| 2002/0099665 | A1 | 7/2002 | Burger et al. |
| 2002/0130187 | A1 | 9/2002 | Berg et al. |
| 2002/0138422 | A1 | 9/2002 | Natsuno |
| 2002/0138735 | A1 | 9/2002 | Felt et al. |
| 2002/0139849 | A1 | 10/2002 | Gangi |
| 2002/0148892 | A1 | 10/2002 | Bardwell |
| 2002/0153424 | A1 | 10/2002 | Li |
| 2002/0158747 | A1 | 10/2002 | McGregor et al. |
| 2002/0178124 | A1 | 11/2002 | Lewis |
| 2002/0180584 | A1 | 12/2002 | McGregor et al. |
| 2002/0186845 | A1 | 12/2002 | Dutta et al. |
| 2003/0025939 | A1 | 2/2003 | Jeran et al. |
| 2003/0028481 | A1 | 2/2003 | Flitcroft et al. |
| 2003/0038177 | A1 | 2/2003 | Morrow |
| 2003/0052168 | A1 | 3/2003 | Wong |
| 2003/0057278 | A1 | 3/2003 | Wong |
| 2003/0061168 | A1 | 3/2003 | Routhenstein |
| 2003/0079096 | A1 | 4/2003 | Murakami |
| 2003/0080183 | A1 | 5/2003 | Rajasekaran et al. |
| 2003/0084220 | A1 | 5/2003 | Jones et al. |
| 2003/0085288 | A1 | 5/2003 | Luu |
| 2003/0115126 | A1 | 6/2003 | Pitroda |
| 2003/0159050 | A1 | 8/2003 | Gantman et al. |
| 2003/0200180 | A1 | 10/2003 | Phelan et al. |
| 2003/0209604 | A1 | 11/2003 | Harrison |
| 2003/0220876 | A1 | 11/2003 | Burger et al. |
| 2003/0231550 | A1 | 12/2003 | MacFarlane |
| 2004/0006654 | A1 | 1/2004 | Bando |
| 2004/0027881 | A1 | 2/2004 | Furukawa |
| 2004/0030660 | A1 | 2/2004 | Shatford |
| 2004/0035942 | A1 | 2/2004 | Silverman |
| 2004/0050930 | A1 | 3/2004 | Rowe |
| 2004/0058705 | A1 | 3/2004 | Morgan et al. |
| 2004/0064612 | A1 | 4/2004 | Pinto et al. |
| 2004/0065733 | A1 | 4/2004 | Fukuoka |
| 2004/0077372 | A1 | 4/2004 | Halpern |
| 2004/0087339 | A1 | 5/2004 | Goldthwaite et al. |
| 2004/0094624 | A1 | 5/2004 | Fernandes et al. |
| 2004/0122685 | A1 | 6/2004 | Bunce |
| 2004/0133787 | A1 | 7/2004 | Doughty et al. |
| 2004/0162932 | A1 | 8/2004 | Mizushima et al. |
| 2004/0177045 | A1 | 9/2004 | Brown |
| 2004/0188519 | A1 | 9/2004 | Cassone |
| 2004/0199469 | A1 | 10/2004 | Barillova et al. |
| 2004/0227859 | A1 | 11/2004 | Liang |
| 2004/0243785 | A1 | 12/2004 | Shanmugasundaram et al. |
| 2004/0243806 | A1 | 12/2004 | McKinley et al. |
| 2004/0251303 | A1 | 12/2004 | Cooper |
| 2004/0255145 | A1 | 12/2004 | Chow |
| 2005/0006462 | A1 | 1/2005 | Rouille et al. |
| 2005/0017068 | A1 | 1/2005 | Zalewski et al. |
| 2005/0022002 | A1 | 1/2005 | Poisner |
| 2005/0029349 | A1 | 2/2005 | McGregor et al. |
| 2005/0038736 | A1 | 2/2005 | Saunders |
| 2005/0039027 | A1 | 2/2005 | Shapiro |
| 2005/0044044 | A1 | 2/2005 | Burger et al. |
| 2005/0050367 | A1 | 3/2005 | Burger et al. |
| 2005/0052924 | A1 | 3/2005 | Nishizawa et al. |
| 2005/0060586 | A1 | 3/2005 | Burger et al. |
| 2005/0071282 | A1 | 3/2005 | Lu et al. |
| 2005/0077349 | A1 | 4/2005 | Bonalle et al. |
| 2005/0092830 | A1 | 5/2005 | Blossom |
| 2005/0108096 | A1 | 5/2005 | Burger et al. |
| 2005/0109838 | A1 | 5/2005 | Linlor |
| 2005/0116026 | A1 | 6/2005 | Burger et al. |
| 2005/0121512 | A1 | 6/2005 | Wankmueller |
| 2005/0122209 | A1 | 6/2005 | Black |
| 2005/0127164 | A1 | 6/2005 | Wankmueller |
| 2005/0127166 | A1 | 6/2005 | Minemura |
| 2005/0133606 | A1 | 6/2005 | Brown |
| 2005/0136964 | A1 | 6/2005 | Saint et al. |
| 2005/0168339 | A1 | 8/2005 | Arai et al. |
| 2005/0177724 | A1 | 8/2005 | Ali et al. |
| 2005/0197859 | A1 | 9/2005 | Wilson et al. |
| 2005/0204077 | A1 | 9/2005 | Kou |
| 2005/0204092 | A1 | 9/2005 | Masuyama et al. |
| 2005/0212657 | A1 | 9/2005 | Simon |
| 2005/0223143 | A1 | 10/2005 | Kang et al. |
| 2005/0224589 | A1 | 10/2005 | Park et al. |
| 2005/0240778 | A1 | 10/2005 | Saito |
| 2005/0246546 | A1 | 11/2005 | Takagi et al. |
| 2005/0253687 | A1 | 11/2005 | Martinez et al. |
| 2005/0258245 | A1 | 11/2005 | Bates et al. |
| 2005/0268058 | A1 | 12/2005 | Drasnin et al. |
| 2005/0268330 | A1 | 12/2005 | Rienzo |
| 2006/0011731 | A1 | 1/2006 | Anders et al. |
| 2006/0027655 | A1 | 2/2006 | Smets et al. |
| 2006/0045555 | A1 | 3/2006 | Morimoto et al. |
| 2006/0077039 | A1 | 4/2006 | Ibi et al. |
| 2006/0097851 | A1 | 5/2006 | Amtmann et al. |
| 2006/0124755 | A1 | 6/2006 | Ito |
| 2006/0169778 | A1 | 8/2006 | Chung |
| 2006/0172606 | A1 | 8/2006 | Irisawa |
| 2006/0186209 | A1 | 8/2006 | Narendra et al. |
| 2006/0219776 | A1 | 10/2006 | Finn |
| 2006/0226217 | A1 | 10/2006 | Narendra et al. |
| 2006/0268764 | A1 | 11/2006 | Harris |
| 2006/0279413 | A1 | 12/2006 | Yeager |
| 2007/0033334 | A1 | 2/2007 | Katayama et al. |
| 2007/0055633 | A1 | 3/2007 | Cheon et al. |
| 2007/0076877 | A1 | 4/2007 | Camp et al. |
| 2007/0108280 | A1 | 5/2007 | Li et al. |
| 2007/0110404 | A1 | 5/2007 | Ching et al. |
| 2007/0145135 | A1 | 6/2007 | Jogand-Coulomb et al. |
| 2007/0145152 | A1 | 6/2007 | Jogand-Coulomb et al. |
| 2007/0195458 | A1 | 8/2007 | Sawai et al. |
| 2007/0205864 | A1 | 9/2007 | Mutti et al. |
| 2007/0257797 | A1 | 11/2007 | Rancien et al. |
| 2007/0293202 | A1 | 12/2007 | Moshir et al. |
| 2008/0046649 | A1 | 2/2008 | Ito |
| 2008/0065830 | A1 | 3/2008 | Aoki et al. |
| 2008/0068173 | A1 | 3/2008 | Alexis et al. |
| 2008/0073436 | A1 | 3/2008 | Nishizawa et al. |
| 2008/0136619 | A1 | 6/2008 | Moran |
| 2008/0147950 | A1 | 6/2008 | Chen |
| 2008/0148077 | A1 | 6/2008 | Lee et al. |
| 2008/0153416 | A1 | 6/2008 | Washiro |
| 2008/0186174 | A1 | 8/2008 | Alexis et al. |
| 2008/0214111 | A1 | 9/2008 | Moshir et al. |
| 2008/0244208 | A1 | 10/2008 | Narendra et al. |
| 2008/0279381 | A1 | 11/2008 | Narendra et al. |
| 2008/0311849 | A1 | 12/2008 | Washiro |
| 2008/0318535 | A1 | 12/2008 | Black et al. |
| 2009/0065571 | A1 | 3/2009 | Jain |
| 2009/0065572 | A1 | 3/2009 | Jain |
| 2009/0069049 | A1 | 3/2009 | Jain |
| 2009/0069050 | A1 | 3/2009 | Jain et al. |
| 2009/0069051 | A1 | 3/2009 | Jain et al. |
| 2009/0069052 | A1 | 3/2009 | Jain et al. |
| 2009/0070272 | A1 | 3/2009 | Jain |

(56) References Cited

U.S. PATENT DOCUMENTS

| | | | |
|---|---|---|---|
| 2009/0070691 | A1 | 3/2009 | Jain |
| 2009/0070861 | A1 | 3/2009 | Jain |
| 2009/0108063 | A1 | 4/2009 | Jain et al. |
| 2009/0150610 | A1 | 6/2009 | Hsu et al. |
| 2009/0152361 | A1 | 6/2009 | Narendra et al. |
| 2009/0166421 | A1 | 7/2009 | Finn |
| 2009/0199283 | A1 | 8/2009 | Jain |
| 2009/0250521 | A1 | 10/2009 | Fujita et al. |
| 2009/0265552 | A1 | 10/2009 | Moshir et al. |
| 2009/0270127 | A1 | 10/2009 | Kakimoto |
| 2009/0290582 | A1 | 11/2009 | Suenaga et al. |
| 2009/0298540 | A1 | 12/2009 | Narendra et al. |
| 2009/0315667 | A1 | 12/2009 | Kawamura et al. |
| 2010/0033307 | A1 | 2/2010 | Narendra et al. |
| 2010/0033310 | A1 | 2/2010 | Narendra et al. |
| 2010/0049878 | A1 | 2/2010 | Yu et al. |
| 2010/0213265 | A1 | 8/2010 | Narendra et al. |
| 2011/0000960 | A1 | 1/2011 | Harris |
| 2011/0053644 | A1 | 3/2011 | Narendra et al. |
| 2011/0073663 | A1 | 3/2011 | Narendra et al. |
| 2011/0073665 | A1 | 3/2011 | Narendra et al. |
| 2011/0077052 | A1 | 3/2011 | Narendra et al. |
| 2011/0110404 | A1 | 5/2011 | Washiro |
| 2011/0171996 | A1 | 7/2011 | Narendra et al. |
| 2011/0180610 | A1 | 7/2011 | Narendra et al. |
| 2011/0220726 | A1 | 9/2011 | Narendra et al. |
| 2011/0223972 | A1 | 9/2011 | Narendra et al. |
| 2011/0269438 | A1 | 11/2011 | Narendra et al. |
| 2011/0271044 | A1 | 11/2011 | Narendra et al. |
| 2011/0272468 | A1 | 11/2011 | Narendra et al. |
| 2011/0272469 | A1 | 11/2011 | Narendra et al. |
| 2016/0234359 | A1 | 8/2016 | Itay et al. |

FOREIGN PATENT DOCUMENTS

| | | | |
|---|---|---|---|
| DE | 10054890 | A1 | 4/2002 |
| EP | 0161060 | A1 | 11/1985 |
| EP | 0818757 | A2 | 1/1998 |
| EP | 1014290 | A2 | 6/2000 |
| EP | 1178450 | A2 | 2/2002 |
| EP | 1189465 | A1 | 3/2002 |
| EP | 1308874 | A3 | 11/2003 |
| EP | 1291748 | A3 | 3/2004 |
| EP | 1117068 | B1 | 10/2007 |
| EP | 1801741 | A3 | 7/2008 |
| FR | 2965082 | A1 | 3/2012 |
| GB | 2316908 | A | 3/1998 |
| JP | 04102112 | | 4/1992 |
| JP | 2000010668 | A | 1/2000 |
| JP | 2005018671 | A | 1/2005 |
| JP | 2007199847 | A | 8/2007 |
| JP | 2007328689 | A | 12/2007 |
| TW | 200905471 | A | 2/2009 |
| TW | 201020934 | A | 6/2010 |
| TW | 201023662 | A | 6/2010 |
| TW | 201126422 | A | 8/2011 |
| WO | 9626500 | A1 | 8/1996 |
| WO | 1996026500 | A1 | 8/1996 |
| WO | 1998012674 | A2 | 3/1998 |
| WO | 1998012674 | A3 | 7/1998 |
| WO | 2000014678 | A1 | 3/2000 |
| WO | 2001088659 | A2 | 11/2001 |
| WO | 2001088659 | A3 | 4/2002 |
| WO | 2001088659 | A9 | 1/2003 |
| WO | 03029942 | A2 | 4/2003 |
| WO | 2003077473 | A1 | 9/2003 |
| WO | 2003081519 | A2 | 10/2003 |
| WO | 2003081519 | A3 | 1/2004 |
| WO | 2003029942 | A3 | 2/2004 |
| WO | 2004012352 | A1 | 2/2004 |
| WO | 2004095169 | A3 | 3/2005 |
| WO | 2005027030 | A1 | 3/2005 |
| WO | 2005119607 | A2 | 12/2005 |
| WO | 2005119608 | A1 | 12/2005 |
| WO | 2006091709 | A2 | 8/2006 |
| WO | 2006108184 | A1 | 10/2006 |
| WO | 2006091709 | A3 | 12/2006 |
| WO | 2007011937 | A3 | 7/2007 |
| WO | 2008121566 | A1 | 10/2008 |
| WO | 2009147548 | A2 | 12/2009 |
| WO | 2009147548 | A3 | 1/2010 |
| WO | 2010099093 | A1 | 9/2010 |

OTHER PUBLICATIONS

Advisory Action notified Feb. 7, 2013 for U.S. Appl. No. 12/960,070.

Final Office Action notified Dec. 11, 2012 for U.S. Appl. No. 12/960,070.

Final Office Action notified Dec. 12, 2012 for U.S. Appl. No. 13/184,204.

Final Office Action notified Feb. 4, 2013 for U.S. Appl. No. 13/552,633.

Final Office Action notified Oct. 25, 2014 for U.S. Appl. No. 12/960,070.

Final Office Action notified Sep. 30, 2014 for U.S. Appl. No. 13/592,323.

International Preliminary Report & Written Opinion notified Dec. 4, 2006 for PCT Patent Application No. PCT/US2005/019988.

International Preliminary Report & Written Opinion notified Dec. 4, 2006 for PCT Patent Application No. PCT/US2005/022993.

International Preliminary Report & Written Opinion notified Jan. 22, 2008 for PCT Patent Application No. PCT/US2006/027847.

International Preliminary Report & Written Opinion notified Sep. 9, 2011 for PCT Patent Application No. PCT/US2010/025014.

International Preliminary Report on Patentability & Written Opinion notified Aug. 28, 2007 for PCT Patent Application No. PCT/US2006/006361.

International Preliminary Report on Patentability and Written Opinion notified Aug. 2, 2007 for PCT Patent Application No. PCT/US2006/006361.

International Preliminary Report on Patentability and Written Opinion notified Aug. 2, 2007 for PCT Patent Application No. PCT/US2006/013603.

International Preliminary Report on Patentability and Written Opinion notified Aug. 2, 2007 for PCT Patent Application No. PCT/US2006/027847.

International Preliminary Report on Patentability and Written Opinion notified Oct. 6, 2009 for PCT Patent Application No. PCT/US2008/057588.

International Search Report & Written Opinion notified Jan. 11, 2006 for PCT Patent Application No. PCT/US2005/019988.

International Search Report & Written Opinion notified Sep. 22, 2006 for PCT Patent Application No. PCT/US2006/006361.

International Search Report and Written Opinion notified Apr. 15, 2010 for PCT Patent Application No. PCT/US2010/025014.

International Search Report notified Aug. 7, 2008 for PCT Patent Application No. PCT/US2008/057588.

International Search Report notified Dec. 16, 2005 for PCT Patent Application No. PCT/US2005/019988.

International Search Report notified Jan. 9, 2006 for PCT Patent Application No. PCT/US2006/013603.

International Search Report notified Mar. 29, 2007 for PCT Patent Application No. PCT/US2006/027847.

International Search Report notified Oct. 9, 2007 for PCT Patent Application No. PCT/US2006/013603.

International Search Report notified Oct. 21, 2005 PCT for PCT Patent Application No. PCT/US2005/022993.

International Search Report notified Sep. 22, 2006 for PCT Patent Application No. PCT/US2006/006361.

International Written Opinion notified Aug. 7, 2008 for PCT Patent Application No. PCT/US2008/057588.

International Written Opinion notified Oct. 9, 2007 for PCT Patent Application No. PCT/US2006/013603.

Lee, Y., "Antenna Circuit Design for RFID Applications", Microchip, AN710, 2003, Microchip Technology Inc., 50 pages.

Non-Final Office Action notified Apr. 3, 2013 for U.S. Appl. No. 13/426,500.

(56) References Cited

OTHER PUBLICATIONS

Non-Final Office Action notified Apr. 19, 2018 for U.S. Appl. No. 15/658,208.
Non-Final Office Action notified Aug. 3, 2011 for U.S. Appl. No. 13/114,473.
Non-Final Office Action notified Dec. 20, 2012 for U.S. Appl. No. 13/593,492.
Non-Final Office Action notified Feb. 1, 2013 for U.S. Appl. No. 13/184,227.
Non-Final Office Action notified Feb. 3, 2011 for U.S. Appl. No. 12/962,953.
Non-Final Office Action notified Jan. 18, 2013 for U.S. Appl. No. 13/651,365.
Non-Final Office Action notified Jul. 3, 2012 for U.S. Appl. No. 13/184,227.
Non-Final Office Action notified Jul. 5, 2013 for U.S. Appl. No. 13/592,323.
Non-Final Office Action notified Jun. 22, 2012 for U.S. Appl. No. 13/184,204.
Non-Final Office Action notified Jun. 27, 2012 for U.S. Appl. No. 12/960,070.
Non-Final Office Action notified Mar. 15, 2013 for U.S. Appl. No. 13/304,662.
Non-Final Office Action notified Mar. 18, 2011 for U.S. Appl. No. 12/941,410.
Non-Final Office Action notified Mar. 30, 2011 for U.S. Appl. No. 12/960,070.
Non-Final Office Action notified May 22, 2015 for U.S. Appl. No. 14/680,684.
Non-Final Office Action notified Nov. 5, 2015 for U.S. Appl. No. 14/866,998.
Non-Final Office Action notified Nov. 9, 2012 for U.S. Appl. No. 13/552,633.
Non-Final Office Action notified Nov. 25, 2011 for U.S. Appl. No. 13/184,240.
Non-Final Office Action notified Nov. 29, 2019 for U.S. Appl. No. 16/218,733.
Non-Final Office Action notified Sep. 15, 2022 for U.S. Appl. No. 17/179,237.
Non-Final Office Action notified Sep. 16, 2016 for U.S. Appl. No. 14/929,297.
Non-Final Office Action notified Sep. 20, 2016 for U.S. Appl. No. 14/948,325.
Non-Final Office Action notified Sep. 21, 2012 for U.S. Appl. No. 13/311,247.
Non-Final Office Action notified Sep. 24, 2015 for U.S. Appl. No. 14/833,113.
Non-Final Office Action notified Sep. 25, 2015 for U.S. Appl. No. 14/747,770.
Non-Final Office Action notified Sep. 29, 2020 for U.S. Appl. No. 16/791,609.
Non-Final Office Action notified Sep. 30, 2010 for U.S. Appl. No. 12/188,346.
Notice of Allowance notified Apr. 14, 2011 for U.S. Appl. No. 12/941,410.
Notice of Allowance notified Apr. 18, 2011 for U.S. Appl. No. 12/962,953.
Notice of Allowance notified Apr. 25, 2011 for U.S. Appl. No. 12/188,346.
Notice of Allowance notified Aug. 15, 2011 for U.S. Appl. No. 13/081,775.
Notice of Allowance notified Dec. 21, 2015 for U.S. Appl. No. 14/866,998.
Notice of Allowance notified Feb. 14, 2013 for U.S. Appl. No. 13/311,247.
Notice of Allowance notified Feb. 15, 2023 for U.S. Appl. No. 17/179,237.
Notice of Allowance notified Feb. 18, 2015 for U.S. Appl. No. 13/592,323.
Notice of Allowance notified Feb. 21, 2013 for U.S. Appl. No. 13/651,365.
Notice of Allowance notified Jan. 10, 2012 for U.S. Appl. No. 13/184,240.
Notice of Allowance notified Jun. 18, 2020 for U.S. Appl. No. 16/218,733.
Notice of Allowance notified Jun. 19, 2015 for U.S. Appl. No. 14/680,684.
Notice of Allowance notified Mar. 3, 2017 for U.S. Appl. No. 14/929,297.
Notice of Allowance notified Mar. 24, 2017 for U.S. Appl. No. 14/948,325.
Notice of Allowance notified May 13, 2013 for U.S. Appl. No. 13/426,500.
Notice of Allowance notified Nov. 16, 2011 for U.S. Appl. No. 13/114,473.
Notice of Allowance notified Nov. 20, 2020 for U.S. Appl. No. 16/791,609.
Notice of Allowance notified Oct. 26, 2015 for U.S. Appl. No. 14/747,770.
Notice of Allowance notified Oct. 28, 2011 for U.S. Appl. No. 13/081,775.
Notice of Allowance notified Oct. 28, 2015 for U.S. Appl. No. 14/833,133.
Notice of Allowance notified Sep. 19, 2018 for U.S. Appl. No. 15/658,208.
Official Letter notified Jan. 26, 2010 for Taiwan Patent Application No. 95105997.
Restriction Requirement notified Aug. 16, 2010 for U.S. Appl. No. 12/188,346.

* cited by examiner

METHOD AND APPARATUS FOR TRANSMITTING DATA VIA NFC FOR MOBILE APPLICATIONS INCLUDING MOBILE PAYMENTS AND TICKETING

CLAIM FOR PRIORITY

This application is a Continuation of, and claims the benefit of priority to, U.S. patent application Ser. No. 18/317,917 filed May 15, 2023, now issued as U.S. Pat. No. 12,147,863 on Nov. 19, 2024, and which is a Continuation of, and claims the benefit of priority to, U.S. patent application Ser. No. 17/179,237, filed Feb. 18, 2021, and now issued as U.S. Pat. No. 11,694,053 on Jul. 4, 2023, which is Continuation of U.S. patent application Ser. No. 16/791,609, filed Feb. 14, 2020, and now issued as U.S. Pat. No. 10,949,726 on Mar. 16, 2021, which is a Continuation of, and claims the benefit of priority to U.S. patent application Ser. No. 16/393,275, filed Apr. 24, 2019, now issued as U.S. Pat. No. 10,607,129 on Mar. 31, 2020, which is a Continuation of, and claims the benefit of priority to U.S. patent application Ser. No. 15/904,328, filed on Feb. 24, 2018, now issued as U.S. Pat. No. 10,318,855 on Jun. 11, 2019, which is a Continuation of, and claims the benefit of priority to U.S. patent application Ser. No. 15/338,436, filed Oct. 30, 2016, now issued as U.S. Pat. No. 9,904,887 on Feb. 27, 2018, which is a Continuation of, and claims the benefit of priority to U.S. patent application Ser. No. 14/517,585, filed Oct. 17, 2014, now issued as U.S. Pat. No. 9,489,608 on Nov. 8, 2016, which is a Continuation of, and claims priority to U.S. patent application Ser. No. 14/460,647, filed Aug. 15, 2014, now issued as U.S. Pat. No. 8,937,549 on Jan. 20, 2015, which is a Continuation of, and claims the benefit of priority to U.S. patent application Ser. No. 13/871,849, on Apr. 26, 2013, now issued as U.S. Pat. No. 8,866,614 on Oct. 21, 2014, which is a Continuation of, and claims the benefit of priority to, U.S. patent application Ser. No. 13/038,341, filed Mar. 1, 2011, now issued as U.S. Pat. No. 8,451,122 on May 28, 2013, which is a Continuation-in-Part of, and claims the benefit of priority to U.S. patent application Ser. No. 12/188,346, filed Aug. 8, 2008, now issued as U.S. Pat. No. 7,961,101 on Jun. 14, 2011, and which are incorporated by reference in their entirety.

FIELD

The present invention relates generally to contactless communications devices, and more specifically to contactless smartcard devices.

BACKGROUND

RFID “tags” can be separated into two broad categories: active tags and passive tags. Active tags are characterized by a local power source such as a battery. Active tags generally transmit information by broadcasting on an RF carrier frequency of choice using a locally generated RF carrier. Active tags are typically used to transmit over long distances, often referred to as “far field communications” (FFC). Antennas used with active RFID tags tend to be large to allow for the communications over long distances.

Passive tags are not powered. Passive tags derive the energy needed to power the tag from an interrogating RF field, and use that energy to transmit response codes by modulating the impedance that the antenna presents to the interrogating field, thereby modulating the signal reflected back to the reader antenna. Passive tags are typically used to transmit over short distances, often referred to as “near field communications” (NFC). For example, passive tags operating at 13.56 MHz are typically designed to communicate with RFID readers a few centimeters away.

Passive tags are typically connected to “loop antennas.” One example of a loop antenna is shown in U.S. Pat. No. 6,568,600, issued to Carpier et al. on May 27, 2003 (the ’600 patent). The device described in the ’600 patent is recognizable as a “credit card sized” passive RFID card (more specifically, a card that conforms to ISO 7816 size requirements). The loop antenna is necessarily large because passive tags are powered using energy received by the antenna from signals transmitted by the RFID reader.

FIG. 12 shows a power supply voltage developed over time by rectifying a voltage induced in a loop antenna in the presence of an interrogating RF field. Once the power supply voltage reaches a critical value, the tag is powered up and can operate. As the antenna size is reduced, it takes longer for the power supply voltage to reach the critical value, and the tag operation may not meet response time specifications. Below a certain antenna size, the power supply voltage may never reach the critical value, and the tag may never power up.

Antenna design for RFID applications is described in a Microchip Technology, Inc. application note entitled “Antenna Circuit Design for RFID Applications” by Youbok Lee, Ph.D., published in 2003 (no month given). Dr. Lee’s application note describes in great detail how to determine size requirements for a passive RFID tag antenna to operate at 13.56 MHz. On equal to 1.414 times the required read range. This analysis confirms that for a read range on the order of a few centimeters, a credit card sized loop antenna can be made near optimal.

Passive tags are seeing widespread use in many applications. For example, mobile device manufacturers are embedding passive RFID tags in mobile devices for NFC applications. Example mobile applications include, but are not limited to, ticketing and mobile payments. U.S. Pat. No. 7,333,062 issued to Leizerovich et al. on Feb. 19, 2008 (the ’062 patent) shows a mobile phone with an integrated loop antenna for an NFC device. As shown in the ’062 patent, the mobile phone provides the real estate necessary to implement a loop antenna at 13.56 MHz.

There have been attempts to implement passive tags in smaller mobile devices. These attempts have been met with limited success due in part to the size of the loop antenna. For example, FIG. 13 shows an RFID tag implementation in a secure digital (SD) memory card manufactured by Wireless Dynamics, Inc. of Calgary, Alberta, Canada. Card 1300 includes an antenna, but the SD card is significantly oversized as a result. Also for example, U.S. Patent Application Publication No.: US 2006/0124755 A1 shows a memory card having a passive tag, but the card must be inserted into a slot to access a loop antenna on a different device. In this implementation, mobile device real estate is still relied upon for loop antenna implementation. It can be seen, therefore, that the size of antennas are proving to be a barrier to further miniaturization of passive RFID tags.

FIG. 14 shows a prior art smartcard controller and antenna in combination. Smartcard controller 330 includes a contactless interface that includes two pads 1472 and 1474 intended for connection to a coil (antenna 1480). Smartcard controller 330 also includes bridge rectifier 1420 to rectify an alternating voltage present on pads 1472 and 1474 when antenna 1480 is inductively coupled to another device and in the presence of an interrogating RF field. Capacitor 1440 is typically tuned to create a resonant circuit at the frequency of interest (e.g., 13.56 MHz). When antenna 1480 is a large loop antenna, then bridge rectifier 1420 provides power to internal circuits as shown in FIG. 12. Demodulator 1430 demodulates data present in the interrogating RF field, and load modulation driver circuit 1410 modulates an impedance seen by the device presenting the interrogating RF field when the coil (antenna 1480) is inductively coupled to a separate device that is presenting the interrogating RF field. This creates a half-duplex communications path between the device presenting the interrogating RF field and smartcard controller 330. Examples of smartcard controllers are the "SmartMX" controllers sold by NXP Semiconductors N.V. of Eindhoven, The Netherlands.

A need exists for a small footprint RFID tag that does not rely on an external device to house an antenna. A need also exists for a memory card compatible RFID tag that is compatible with standard memory card slots on mobile devices.

DESCRIPTION OF EMBODIMENTS

Figure 1:
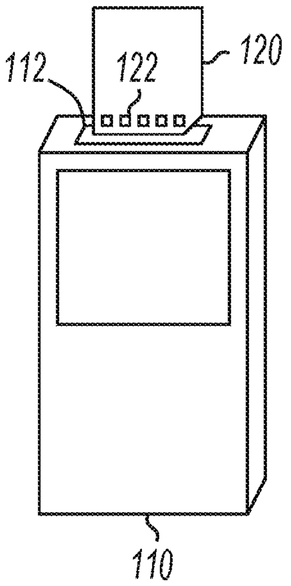
FIG. 1 shows a mobile computing device and a small RFID card compatible with a memory card slot.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a mobile computing device and a small RFID card compatible with a memory card slot. Mobile computing device 110 is shown as a mobile phone in FIG. 1, but this is not a limitation of the present invention. For example, mobile computing device 110 may be a personal digital assistant (PDA), a smartphone, a mobile phone, a handheld computer, a desktop computer, or any other device capable of operating as described herein.

Mobile computing device 110 includes memory card slot 112. Memory card slot 112 is a slot capable of accepting RFID card 120. For example, memory card slot 112 may have physical dimensions compatible with RFID card 120, and may have a communications interface that operates using a protocol compatible with RFID card 120. In some embodiments of the present invention, memory card slot 112 is a memory card slot designed to accept and communicate with memory cards. As used herein, the term "memory card slot" refers to any add-on slot capable of accepting a card having memory accessible by a mobile computing device such as that shown in FIG. 1. For example, a memory card slot may be compatible with an industry standard communications protocol, or may be compatible with a widely accepted communications protocol that is not necessarily formally documented as an industry standard. Examples include slots that are compatible with the Multimedia Memory Card (MMC) protocol, Memory Stick DUO protocol, secure digital (SD) protocol, and Smart Media protocol. The foregoing list is meant to be exemplary, and not exhaustive. Memory card slot 112 may be compatible with many memory card slot protocols other than those explicitly listed above without departing from the scope of the invention. Further, in some embodiments, memory card slot 112 accepts a subscriber identity module (SIM) card. Memory card slot 112 may be exposed on an edge of mobile computing device 110 as shown, or may be behind a cover. For example, memory card slot 112 may be behind a battery cover, behind a battery, or anywhere else on mobile computing device 110.

RFID card 120 includes electrical contacts 122 as part of a host interface that communicates with memory card slot 112. For example, electrical contacts 122 may provide connectivity compliant with a communications protocol for memory cards. RFID card 120 includes RFID functionality, and may also include memory accessible by mobile computing device 110. For example, in some embodiments, RFID card 120 includes a smartcard controller and an inductive element capable of interacting with an NFC reader (e.g., an ISO 14443 compliant interface). In other embodiments, RFID card 120 does not include memory accessible by mobile computing device 110. RFID card 120 may include functionality beyond memory and RFID. Electrical contacts 122 may also be compliant with a smartcard "contact" interface (e.g., ISO 7816).

In various embodiments of the present invention, the RFID functionality in RFID card 120 is accessed by mobile computing device 110 using memory card access commands already defined for use in memory card slot 112. Accordingly, the various embodiments of the present invention enable the implementation of RFID functions beyond memory accesses without defining new commands. In some embodiments, new commands for the RFID card are embedded inside the data bits subsequent to memory card read/write commands. RFID card 120 then decides if the incoming data bits are meant for regular read/write memory functions or for RFID functions. In other words, functions in addition to standard memory card functions may be accessed through commands "hidden" in the data stream that can be exchanged using existing memory card access commands and functions. According to the various embodiments of the invention, both existing memory card functions and RFID functions may be implemented without requiring changes in how the host protocol is built.

The combination of mobile computing device 110 and RFID card 120 may be used for any purpose. For example, in some embodiments, RFID card 120 may interact with a point-of-sale payment device to effect mobile payments. Also for example, in some embodiments, RFID card 120 may be used in wave-and-pay ticketing in mass transit environments, such as MIFARE.

Figure 2:
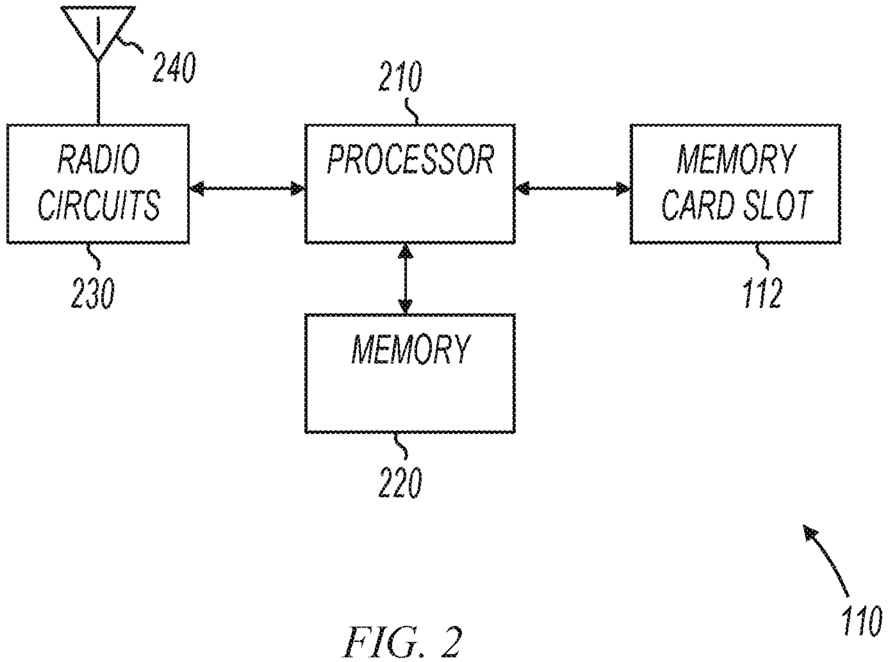
FIG. 2 shows a block diagram of a mobile computing device.

FIG. 2 shows a block diagram of a mobile computing device. Mobile computing device 110 includes antenna 240, radio circuits 230, processor 210, memory 220, and memory card slot 112. In some embodiments, mobile computing device 110 is a mobile phone, or includes mobile phone functionality. For example, antenna 240 and radio circuits 230 may be utilized to communicate with a cellular telephone network. Further, in some embodiments, mobile computing device 110 is a wireless local area network (WLAN) or wireless wide area network (WWAN) device. For example, antenna 240 and radio circuits 230 may be utilized to communicate with a wireless access point. In some embodiments, antenna 240 and radio circuits 230 are omitted, and mobile computing device 110 does not utilize wireless connectivity.

Processor 210 represents a processor capable of communicating with the other blocks shown in mobile computing device 110. For example, processor 210 may be a microprocessor, a digital signal processor (DSP), a microcontroller, or the like. Further, processor 210 may be formed from state machines or other sequential logic. In operation, processor 210 may read instructions from memory 220 and perform actions in response thereto. For example, processor 210 may execute program instructions that influence communications between mobile computing device 110 and a device coupled to memory card slot 112.

Memory card slot 112 is described above with reference to FIG. 1. Memory card slot 112 includes circuitry compatible with RFID card 120. Mobile computing device 110 may communicate with RFID card 120 by using a standard set of memory card access commands. For example, processor 210 may use memory card write commands to write to memory in RFID card 120, and may use memory card read commands to read from memory in RFID card 120. Mobile computing device 110 may also communicate with RFID card 120 using an ISO 7816 compatible interface or the like. For example, when RFID card 120 is a SIM card, mobile computing device 110 may communicate with a smartcard controller within the SIM card.

Mobile computing device 110 may access the RFID functionality in RFID card 120 using "hidden" commands embedded in memory card access commands. For example, a memory card write command may include a unique data string to identify the memory card write command as a command to be diverted for purposes other than a memory write. In addition, the sector address provided with the memory card write command may be set to a particular address value to further identify the memory card write command as a command to be diverted. In addition to specific address/data values to identify the memory card access command as a command to be diverted for a purpose other than a memory access, the memory access command may include data bits to further specify the type and function of hidden command. Example formats of hidden commands are described further below. In some embodiments, a read command is issued right after a write command to enable data flow from the non-memory card functions to the host, where the write command's data had the hidden commands. The combination of a memory card write command and a memory card read command can be used in this manner to form a hidden read command.

In some embodiments, memory card slot 112 is powered down after periods of inactivity to save power. For example, memory card slot 112 may be powered up when processor 210 issues a memory card write or read command, but may then be powered down to save power. When memory card slot 112 is powered down, any device coupled to the memory card slot is also powered down. For example, if RFID card 120 (FIG. 1) is coupled to the memory card slot, then RFID card 120 is powered down when memory card slot 112 is powered down.

In various embodiments of the present invention, processor 210 executes software resident in memory 220 to maintain power to memory card slot 112 (and to RFID card 120). For example, periodic hidden commands may be sent to RFID card 120 for the purpose of keeping power applied while RFID card 120 is expected to be providing RFID functionality. Also for example, a hidden command may be sent to RFID card 120 for the purpose of cycling power to a smartcard controller resident on the card. These hidden commands are described further below with respect to later figures.

Figure 3A:
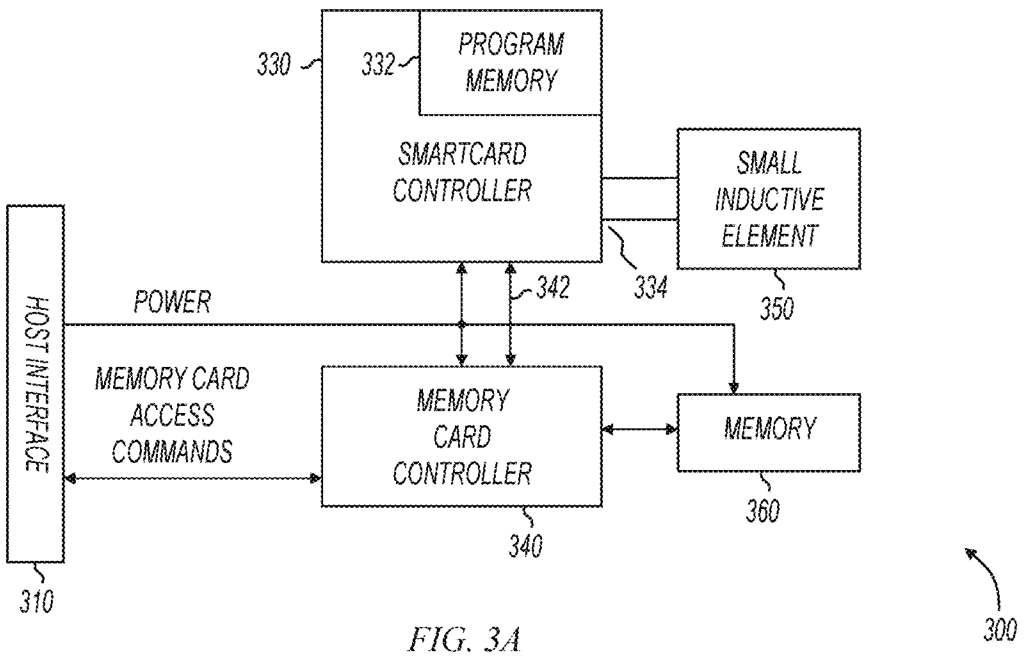
FIGS. 3A-3B show block diagrams of memory card compatible RFID cards with integrated inductive elements.

FIG. 3A shows a block diagram of a memory card compatible RFID card with an integrated inductive element. RFID card 300 represents possible embodiments of RFID card 120 (FIG. 1). RFID card 300 includes host interface 310, memory card controller 340, memory 360, smartcard controller 340, program memory 332, and small inductive element 350. RFID card 300 is capable of communicating with a memory card slot in a mobile computing device. Further, RFID card 300 does not require memory card slots to implement extended input/output functions. For example, and not by way of limitation, in SD and micro SD embodiments, RFID card 300 is operable in any SD or microSD memory card slot, and does not require a secure digital input output (SDIO) memory card slot.

Host interface 310 includes electrical contacts to interface with a memory card slot. For example, host interface 310 includes contacts such as contacts 122 (FIG. 1). Also for example, in some embodiments, host interface 310 includes recessed electrical contacts. Host interface 310 may also include circuitry such as drivers, receivers, terminations, and the like.

In embodiments represented by FIG. 3A, memory card controller 340 communicates with the mobile device using memory card access commands. Memory card controller 340 also communicates with memory 360. Memory card controller 340 determines whether each command should result in a memory operation with memory 360, whether a hidden command should be diverted to smartcard controller 330, or whether memory card controller 340 should take action in response to a hidden command. In some embodiments, memory card controller 340 executes instructions that are stored in an internal memory or stored in memory 360. In some embodiments, memory card controller 340 includes special purpose hardware useful to determine whether a command should be diverted. In other embodiments, memory card controller 340 may be a microcontroller identical in all respects to a controller found in memory cards, except for the program that it executes.

Memory 360 may be any type of volatile or non-volatile memory. For example, memory 360 may be volatile memory such as static random access memory (SRAM) or dynamic random access memory (DRAM). Also for example, memory 360 may be nonvolatile memory such as NOR FLASH memory or NAND FLASH memory. In various embodiments of the present invention, memory 360 represents memory that is accessed by a mobile computing device using memory card access commands defined for that purpose.

When RFID card 300 is communicating with a memory card slot in a mobile computing device, the mobile computing device may send a memory card access command in order to access memory 360. Also, for example, the mobile computing device may send a memory card access command that contains a hidden command. Memory card controller 340 detects the presence of the hidden command, and diverts all or a portion of the memory access command to smartcard controller 330 using communication bus 342. Communication bus 342 may have any number of conductors and may take any form. For example, communication bus 342 may be a serial port, a parallel port, or may include multiple data conductors, multiple address conductors, and/or conductors to carry control signals such as clock signals. In some embodiments, memory card controller 340 takes one or more actions in response to a hidden command. For example, memory card controller 340 may modify clock signals in response to a hidden command.

Memory card controller 340 can detect the hidden command in many ways. For example, in some embodiments, the memory card access command may include a specific address value or a specific data value. Memory card controller 340 detects commands that include one or both of the specific address value or specific data value and routes the command appropriately. The specific address value and specific data value used for this purpose are referred to herein as the hidden command address value and the hidden command data value.

In some embodiments, memory card controller 340 detects the presence of hidden commands based only on the hidden command address value. In these embodiments, memory card controller 340 checks the address value included in a memory card access command, and diverts the command (or takes some other action) if it matches the hidden command address value. In some embodiments, memory card controller 340 detects the presence of hidden commands based only on the hidden command data value. In these embodiments, memory card controller 340 checks a data value included in the memory card access command, and diverts all or a portion of the command if it matches the hidden command data value. In still further embodiments, memory card controller 340 detects the presence of hidden commands based on both the hidden command address value and the hidden command data value. In these embodiments, memory card controller 340 diverts the command only if both the memory card access address and data match the hidden command address value and data value, respectively.

The hidden command address value and hidden command data value may be specified in many ways. For example, all RFID cards may be issued with fixed values. In these embodiments, each time the RFID functions are accessed, the same hidden command address and/or data value is included in the memory card access command. Also, for example, different RFID cards may be issued with unique values. In these embodiments, each RFID card may provide these values to a mobile computing device when queried. Also, for example, hidden command address and/or data values may be specified by the mobile computing device. In still further embodiments, hidden command address and data values may be dynamic. The hidden command address and data values may change each time power is applied or on a periodic basis.

Smartcard controller 330 receives hidden commands diverted by memory card controller 340. Smartcard controller 330 further interprets the hidden commands and performs actions in response thereto. Smartcard controller 330 executes instructions stored in program memory 332. In some embodiments, program memory 332 is embedded in smartcard controller 330, and in other embodiments, program memory 332 is part of memory 360.

Smartcard controller 330 is a dual interface smartcard controller with one of the interfaces including RFID functionality. In some embodiments, smartcard controller 330 is compatible with passive RFID tag readers in NFC applications. For example, smartcard controller 330 may be a device capable of implementing all or part of the ISO 14443 standard for contactless NFC devices. Also, for example, smartcard controller 330 may be a dual interface smartcard controller capable of implementing both ISO 7816 and ISO 14443 standards for contact/contactless requirements. The “SmartMX” family of controllers available from NXP Semiconductors N.V. of The Netherlands are examples of suitable dual interface smartcard controllers. These controllers provide RFID functionality at 13.56 MHz. The various embodiments of the present invention operate at 13.56 MHz, but are not limited to operation at this frequency. In some embodiments, smartcard controller interoperates with MIFARE systems for ticketing applications.

Figure 14:
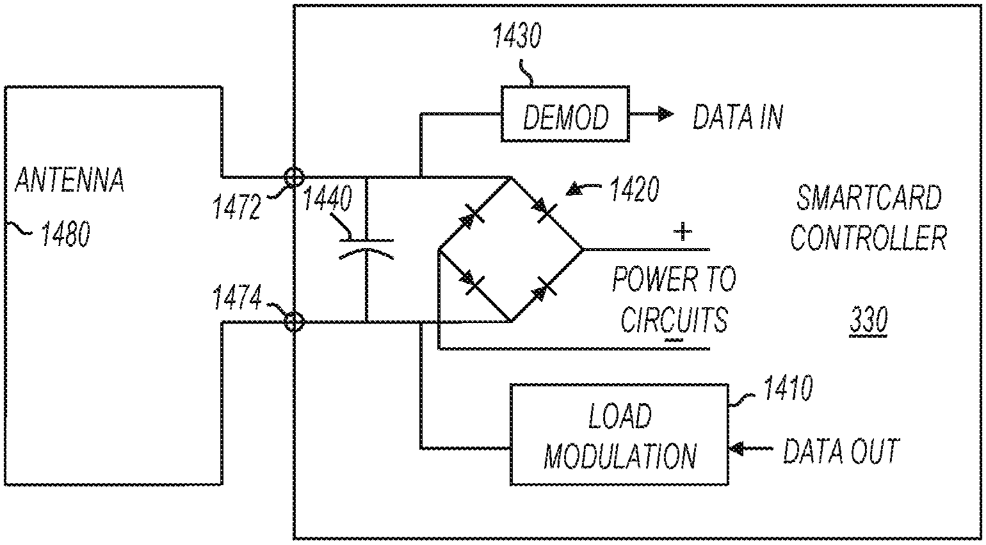
FIG. 14 (PRIOR ART)
FIG. 14 shows a prior art smartcard controller and antenna in combination.

Smartcard controller 330 receives power from the host interface. By not receiving power from the interrogating RF field, the necessity of a loop antenna for power generation is negated. Smartcard controller 330 includes a contactless interface that in turn includes antenna port 334. Antenna port 334 includes at least two pads for connection to an antenna, shown as 1742 and 1744 in FIG. 14 and later figures. In FIG. 3A, antenna port 334 is coupled to small inductive element 350.

Small inductive element 350 includes a coil wound around a magnetic core. As described with reference to later figures, small inductive element may include one or more coils or antennas. The coil of small inductive element is too small to draw power from the interrogating RF field, but this is not necessary since smartcard controller 330 is powered by the host device through host interface 310. Small inductive element 350 interacts with an antenna in an RFID reader similar to the way that primary and secondary coils in a transformer interact. The RFID reader has a coil resonant at 13.56 MHz functioning as the primary coil of a transformer. Small inductive element 350 functions as the secondary coil of the transformer. Accordingly, the transmitter “sees” the impedance of the secondary coil (small inductive element 350). Smartcard controller 330 is able to modulate reflected RF signals using circuitry to modify the impedance at the antenna port 334.

Small inductive element 350 can be made very small. For example, in some embodiments, RFID card 120 is a miniSD card, microSD card, or SIM card, and small inductive element 350 is small enough to be completely contained in the miniSD, microSD, or SIM form factor. A specific embodiment of a small inductive element in a memory card form factor is described below with reference to FIG. 4.

In various embodiments of the invention, memory card controller 340 and smartcard controller 330 are implemented in many different ways. For example, in some embodiments, the various components are implemented in hardware. In these embodiments, the various components may be implemented as separate integrated circuits, or in a combined integrated circuit. Also, for example, in some embodiments, the various components may be implemented in software, or in a combination of hardware and software. In some embodiments, RFID card 300 may include a microprocessor, and the components may be implemented as software modules running on the microprocessor. In other embodiments, RFID card 300 may include multiple processors, and the components may be implemented as software modules distributed across the multiple processors.

Figure 3B:
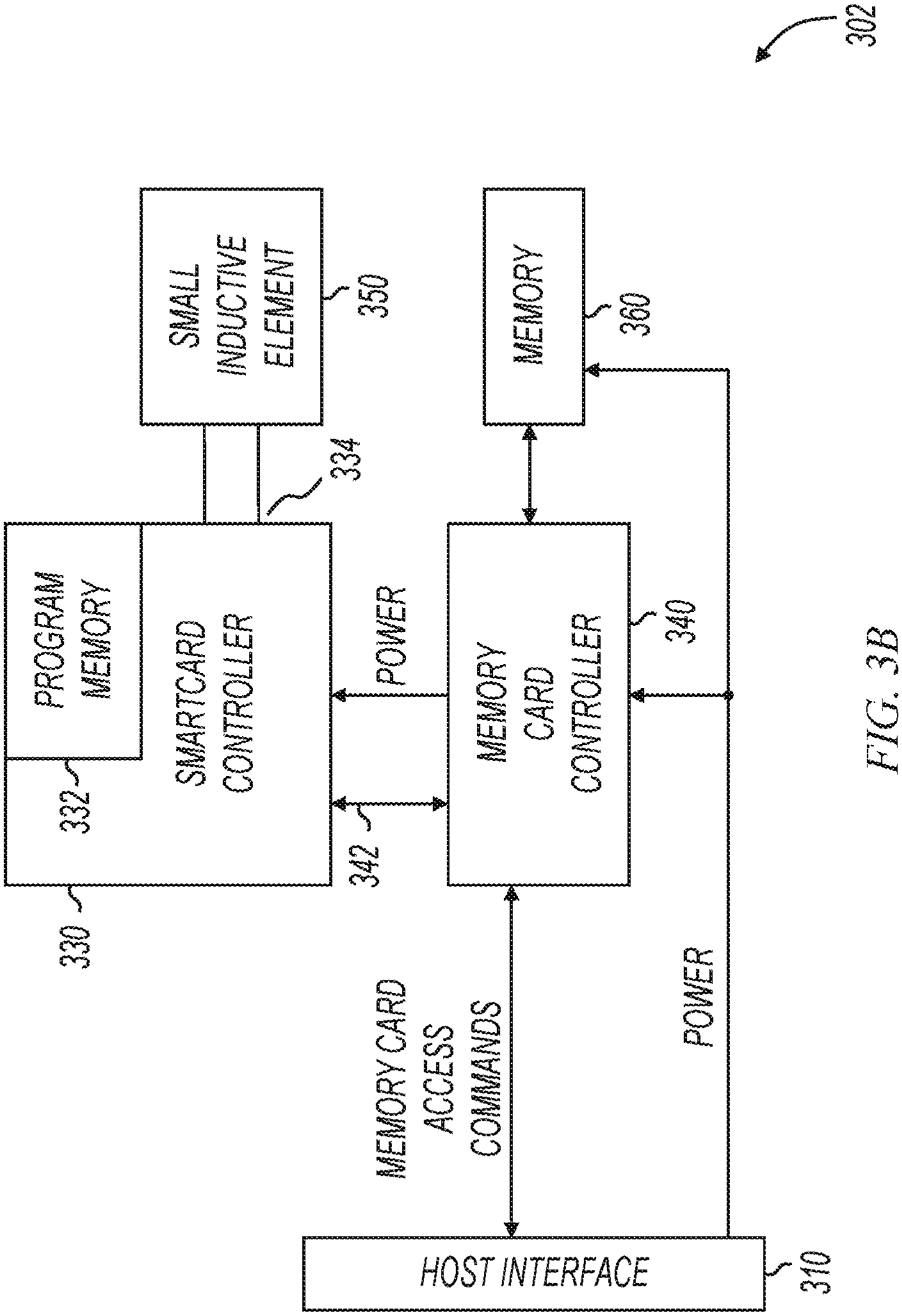

FIG. 3B shows a block diagram of a memory card compatible RFID card with an integrated inductive element. RFID card 302 represents possible embodiments of RFID card 120 (FIG. 1). RFID card 302 includes host interface 310, memory card controller 340, memory 360, smartcard controller 340, program memory 332, and small inductive element 350, all of which are described above with reference to FIG. 3A. RFID card 302 is capable of communicating with a memory card slot in a mobile computing device. Further, RFID card 302 does not require memory card slots to implement extended input/output functions. For example, and not by way of limitation, in SD and microSD embodiments, RFID card 302 is operable in any SD or microSD memory card slot, and does not require a secure digital input output (SDIO) memory card slot.

In embodiments represented by FIG. 3B, smartcard controller 330 receives power from memory controller 340. In these embodiments, memory controller 340 has direct control over the power provided to smartcard controller 330. Memory controller 340 may apply and/or remove power from smartcard controller 330 in response to commands received over the host interface. For example, memory controller 340 may receive a hidden command to reset smartcard controller 330 by causing a reboot through a power cycle.

Figure 4:
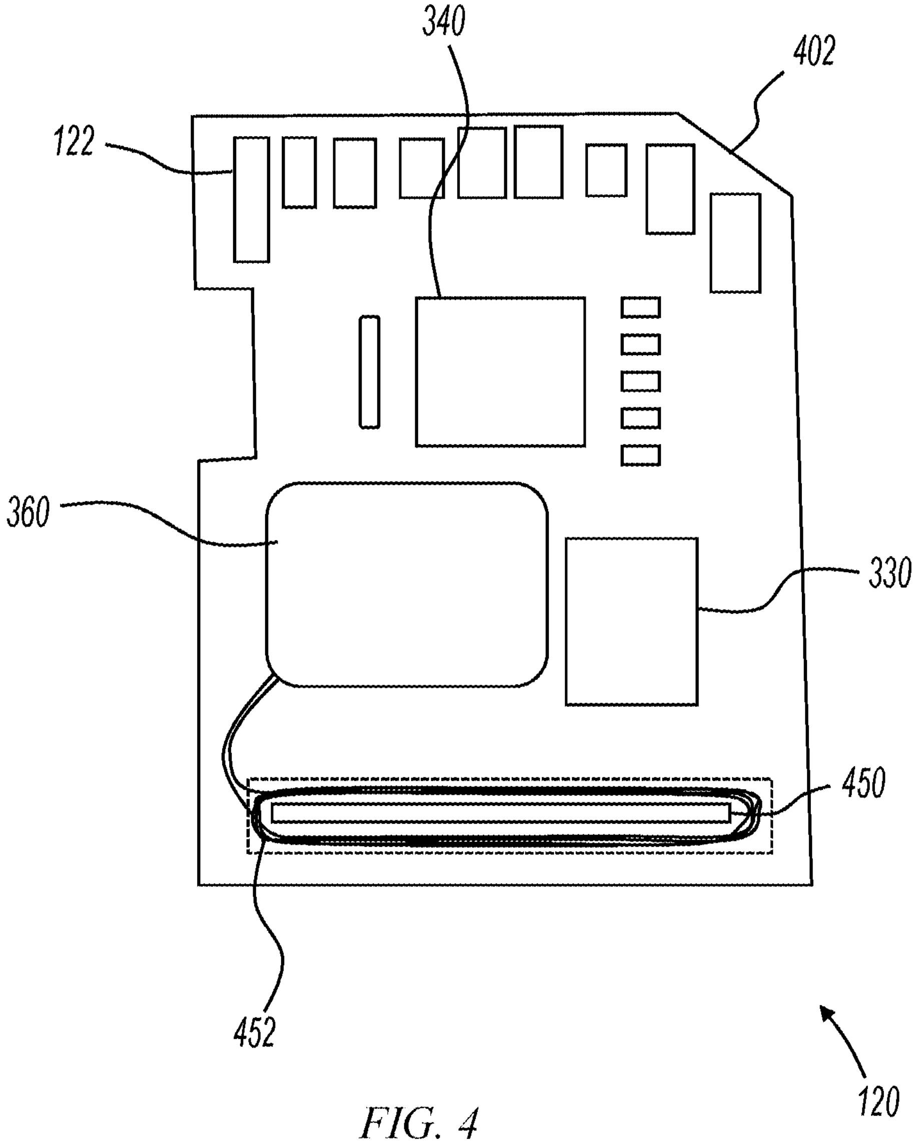
FIG. 4 shows a memory card compatible RFID card with an integrated inductive element.

FIG. 4 shows a memory card compatible RFID card with an integrated inductive element. RFID card 120 is shown in an SD card form factor, although this is not a limitation of the present invention. For example, other form factors within the scope of the present invention include, but are not limited to, microSD form factors and SIM card form factors. RFID card 120 includes electrical contacts 122, memory card controller 340, smartcard controller 330, memory 360, magnetic core 450, and coil 452, all affixed to circuit board 402.

Magnetic core 450 and coil 452 implement small inductive element 350 (FIGS. 3A, 3B). As can be seen in FIG. 4, the small inductive element fits entirely within the memory card form factor. The small inductive element does not provide power generation for smartcard controller 330, and so does not need to be made large for that purpose.

Figure 5:
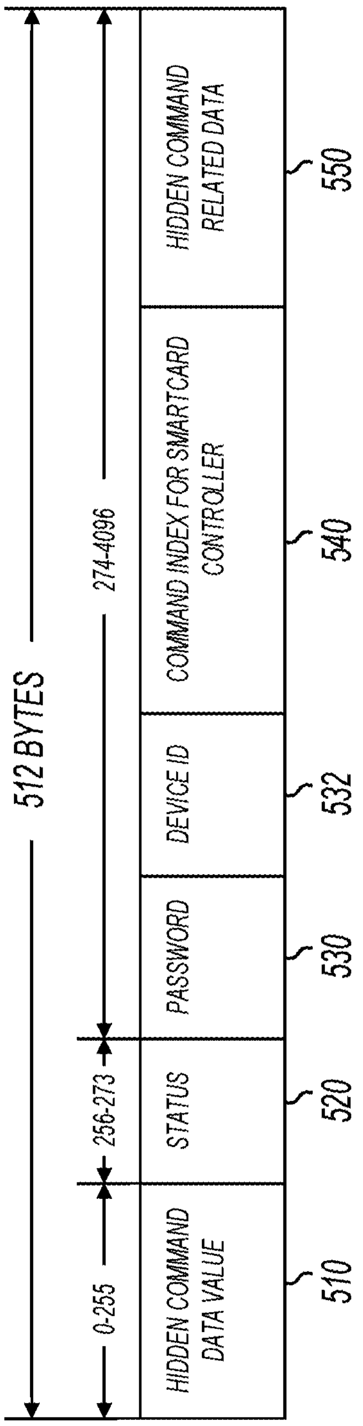
FIG. 5 shows a data portion of a memory card write command.

FIG. 5 shows a data portion of a memory card write command. Included are hidden command data value 510, status field 520, password field 530, device ID 532, command index 540, and hidden command related data 550. In the example of FIG. 5, the data portion is 512 bytes in length, although this is not a limitation of the present invention. Any amount of data may be included in the write command, and each field shown in FIG. 5 may be any length.

In the example of FIG. 5, the hidden command data value is 256 bits long, although any length may be used without departing from the scope of the present invention. In some embodiments, hidden command data value 510 is used to identify a memory write command as a hidden command. When a write command is received having data in the first 256 bits that match the hidden command data value, the command is identified as one to be diverted to the smartcard controller. As described above, a hidden command address value may be used in conjunction with, or instead of, a hidden command data value to identify the memory write command as a hidden command.

The remaining fields have significance when the memory write is a hidden command. For example, if the first 256 bits do not match the hidden command data value (or if the write address does not match the hidden command address value, or both) then the remaining bits in the data field are to be treated as data in a normal memory write command. In contrast, when the memory write is a hidden command, the remaining fields are used to further interpret the hidden command.

Memory card controller 340 (FIGS. 3, 4) inspect the hidden command data value 510, status field 520, and possibly password field 530 and device ID 532. In some embodiments, if the command is identified as a hidden command, memory card controller 340 forwards the password 530, command index 540, and related data 550 to smartcard controller 330. In other embodiments, memory card controller 340 may directly take actions based on the hidden command.

Status field 520 may include any information relating to the status of the hidden command. For example, status field 520 may include one or more bits to signify to memory card controller 340 whether the host (mobile computing device) is expecting the smartcard controller to return data in response to the hidden command. For example, when status field 520 signifies a write, memory card controller 340 forwards the password, device ID, command index, and related data without expecting to return any data to the host. Also for example, when status field 520 signifies a read, memory card controller 340 forwards the password, device ID, command index, and related data with the expectation that smartcard controller 330 may provide data to be sent to the host in response to a memory card read command. The combination of a memory card write command followed shortly thereafter by a memory card read command may be used to provide "read" functionality to the smartcard controller. Read operations from the smartcard controller are described further below with reference to FIG. 8.

Password field 530 includes a password to allow smartcard controller 330 to authenticate the host to the RFID card. In some embodiments, every hidden command includes a password. Each time the password, device ID, command index, and related data is diverted to the smartcard controller, the password is checked to authenticate the host to the RFID card.

Device ID 532 uniquely identifies the host (mobile computing device). The device ID may be checked by the smartcard controller to ensure that the RFID card is inserted in the host to which it is authenticated. Some embodiments of the present invention enforce a unique host/card pairing using the device ID, and other embodiments allow smartcard controller functions to be accessed by any host.

Command index 540 identifies the type of hidden command. The number of possible hidden commands is limited only by the number of bits allocated thereto. Any number of bits may be allocated to command index 540 without departing from the scope of the present invention. Hidden command related data 550 may be utilized differently for each type of hidden command. Any number of bits may be used for hidden command related data 550.

The data shown in FIG. 5 is provided as an example, and the data field of a memory card access command may include more or fewer data fields than those shown in FIG. 5. The present invention is not limited by the number or content of the fields in a memory card access command.

Figure 6:
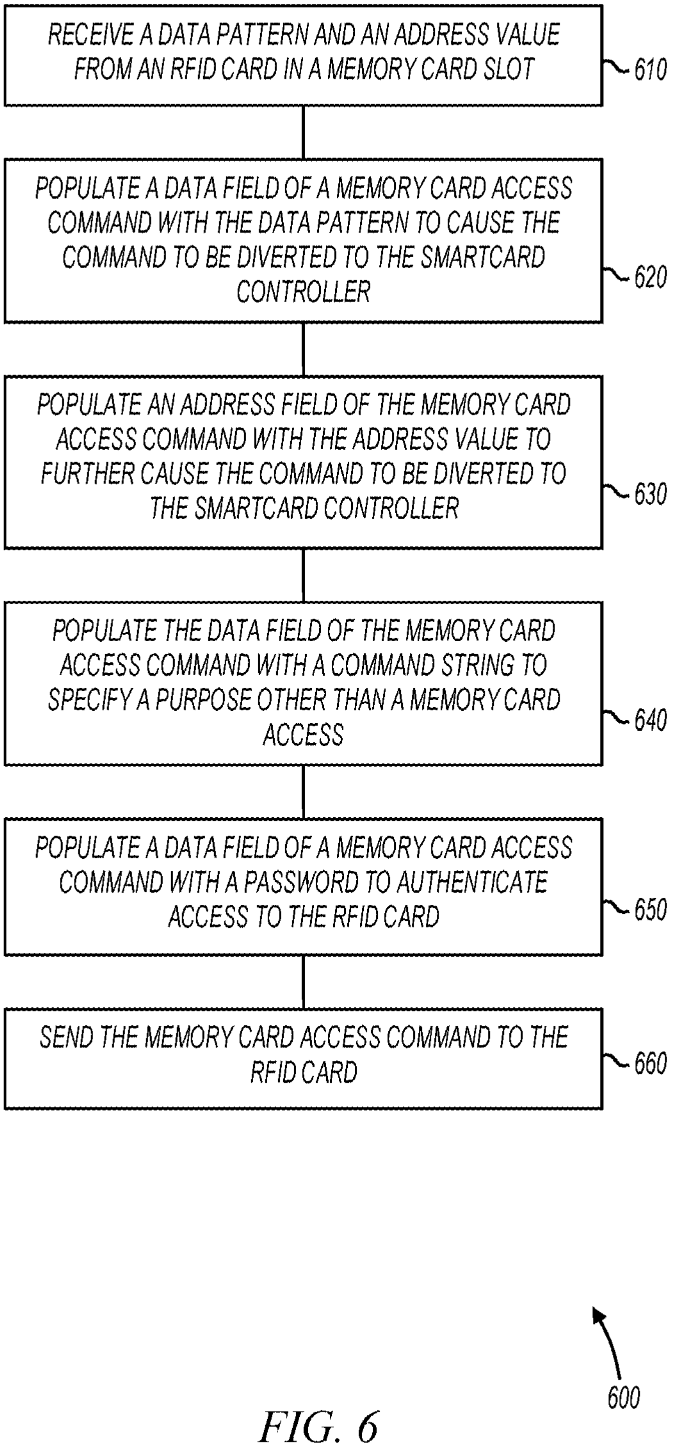
FIGS. 6-11 show flowcharts of methods in accordance with various embodiments of the present invention.

FIG. 6 shows a flowchart in accordance with various embodiments of the present invention. In some embodiments, method 600 may be used by a mobile computing device to communicate with an RFID card in a memory card slot. In some embodiments, method 600, or portions thereof, is performed by a mobile computing device with a memory card slot, and in other embodiments, method 600, or portions thereof, is performed by software. The various actions in method 600 may be performed in the order presented, in a different order, or simultaneously. Further, in some embodiments, some actions listed in FIG. 6 are omitted from method 600.

Method 600 begins at 610 in which a data pattern and an address value are received from an RFID card in a memory card slot. The data pattern corresponds to the hidden command data value, and the address value corresponds to the hidden command address value. In some embodiments, the mobile device may receive the data value and in other embodiments, the mobile device may receive the address value. In some embodiments, the actions of 610 may occur once when the RFID card is first inserted in the memory card slot. The mobile computing device may then use the address and data values each time it creates a hidden command. In other embodiments, the actions of 610 may occur each time the RFID card is inserted in the memory slot. In still further embodiments, the actions of 610 may occur periodically. Each time the actions 610 occur, the data pattern may be the same or different, and the address value may be the same or different.

At 620, a data field of a memory card access command is populated with the data pattern to cause the command to be diverted to a smartcard controller on the RFID card. For example, the data pattern may be written to the data field as the hidden command data value 510 (FIG. 5).

At 630, an address field of the memory card access command is populated with the address value to further cause the command to be diverted to the smartcard controller. In some embodiments, only one of 620 or 630 is utilized. In these embodiments, the presence of a hidden command is signified by the data pattern alone, or the address value alone.

At 640, the data field of the memory card access command is populated with a command string to specify a purpose other than a memory card access. For example, the command string may be written to the data field as the command index 540 for the smart card controller. This command may be used for any purpose. For example, one or more hidden commands may have as a sole purpose keeping power provided to the memory card slot so that the RFID card continues to receive power.

At 650, the data field of a memory card access command is populated with a password to authenticate access to the RFID card coupled to the memory card slot. In some embodiments, a password is included in the data field for every hidden command. In other embodiments, a password is only included at the beginning of an exchange.

At 660, the memory card access command is sent to the RFID card coupled to the memory card slot. For example, a mobile computing device (110, FIGS. 1, 2) may send the memory card access command to an RFID card (120, FIGS. 1, 3, 4) in a memory card slot (112, FIGS. 1, 2). The RFID card includes a memory card controller (340, FIG. 3) to divert the command (or take some other action) based on the data fields populated in method 600.

Figure 7:
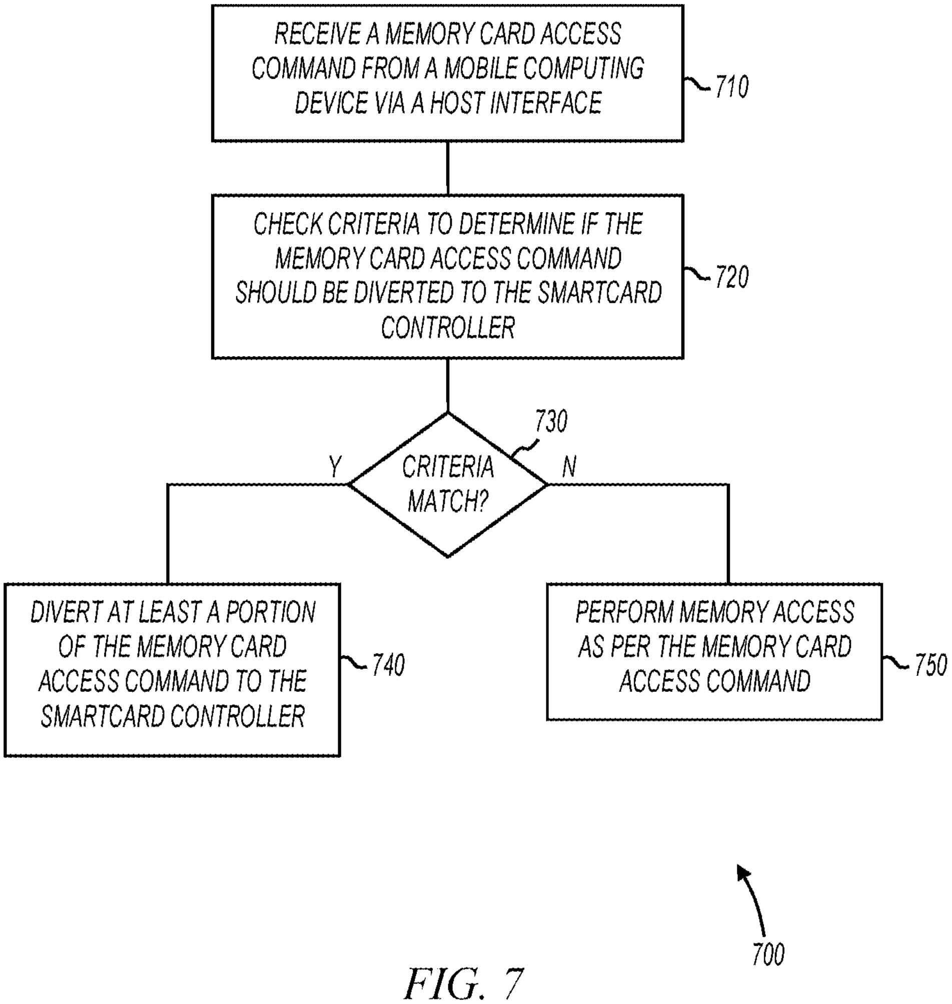

FIG. 7 shows a flowchart in accordance with various embodiments of the present invention. In some embodiments, method 700 may be used by an RFID card in a memory card slot. In some embodiments, method 700, or portions thereof, may be performed by a memory card controller within a memory card compatible RFID card, and in other embodiments, method 700, or portions thereof, is performed by software. The various actions in method 700 may be performed in the order presented, in a different order, or simultaneously. Further, in some embodiments, some actions listed in FIG. 7 are omitted from method 700.

Method 700 begins at 710 in which a memory card access command is received from a mobile computing device via a host interface. The actions of 710 correspond to an RFID card in a memory card slot of a mobile computing device receiving a memory card access command.

At 720, the memory card controller checks criteria in the memory card access command to determine if the memory card access command should be diverted to a smartcard controller resident on the RFID card. The criteria may be one or both of a hidden command data value, a hidden command address value, or both. If there is a criteria match at 730, then a hidden command is present, and at least a portion of the memory card access command is diverted at 740. If there is not a criteria match, then no hidden command is present, and a memory access is performed at 750.

Figure 8:
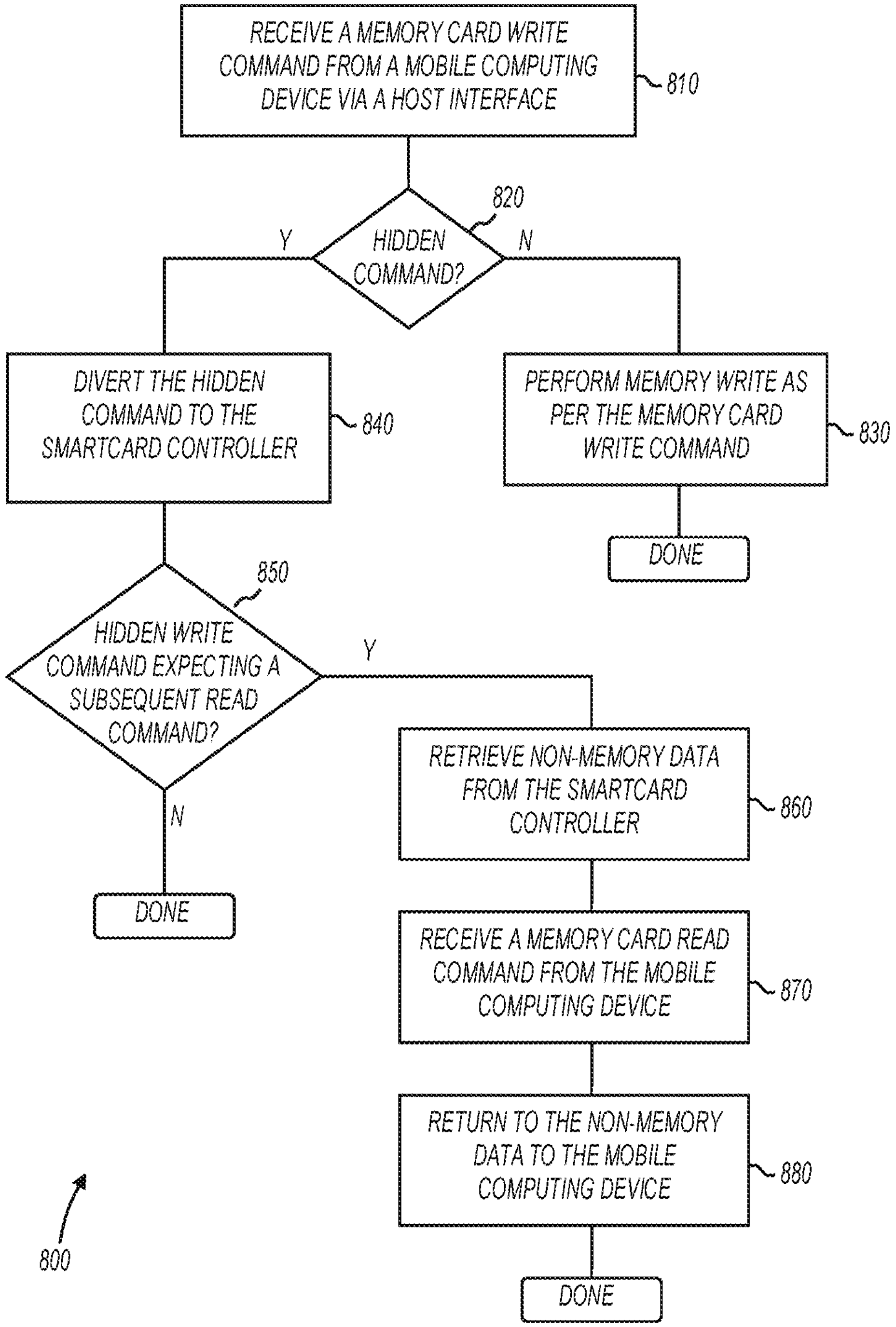

FIG. 8 shows a flowchart in accordance with various embodiments of the present invention. In some embodiments, method 800 may be used by an RFID card in a memory card slot. In some embodiments, method 800, or portions thereof, is performed by a memory card controller within an RFID card, and in other embodiments, method 800, or portions thereof, is performed by software. The various actions in method 800 may be performed in the order presented, in a different order, or simultaneously. Further, in some embodiments, some actions listed in FIG. 8 are omitted from method 800.

Method 800 begins at 810 in which a memory card write command is received from a mobile computing device via a host interface. If the memory card write command is determined to be a hidden command, processing continues with 840; otherwise, a memory write is performed at 830.

At 840, the hidden command is diverted to a smartcard controller. In some embodiments, this corresponds to sending command index 540 and hidden command related data 550 (FIG. 5) to the smartcard controller. If the hidden command is determined to be a "read" at 850, processing continues at 860; otherwise, the hidden command processing is done. At 860, the memory card controller retrieves non-memory data from the smartcard controller, and at 870, a memory card read command is received from the mobile computing device. At 880, the non-memory data is returned to the mobile computing device.

Method 800 demonstrates how a mobile computing device can perform a read from a smartcard controller in a memory card compatible RFID card. The mobile computing device issues a memory card write command with a hidden command having a status field designating a read, and then the mobile computing device issues a memory card read command. The processing in the card receives the hidden command, identifies it as a read, and then returns data to the mobile computing device in response to a subsequent memory card read command.

Figure 9:
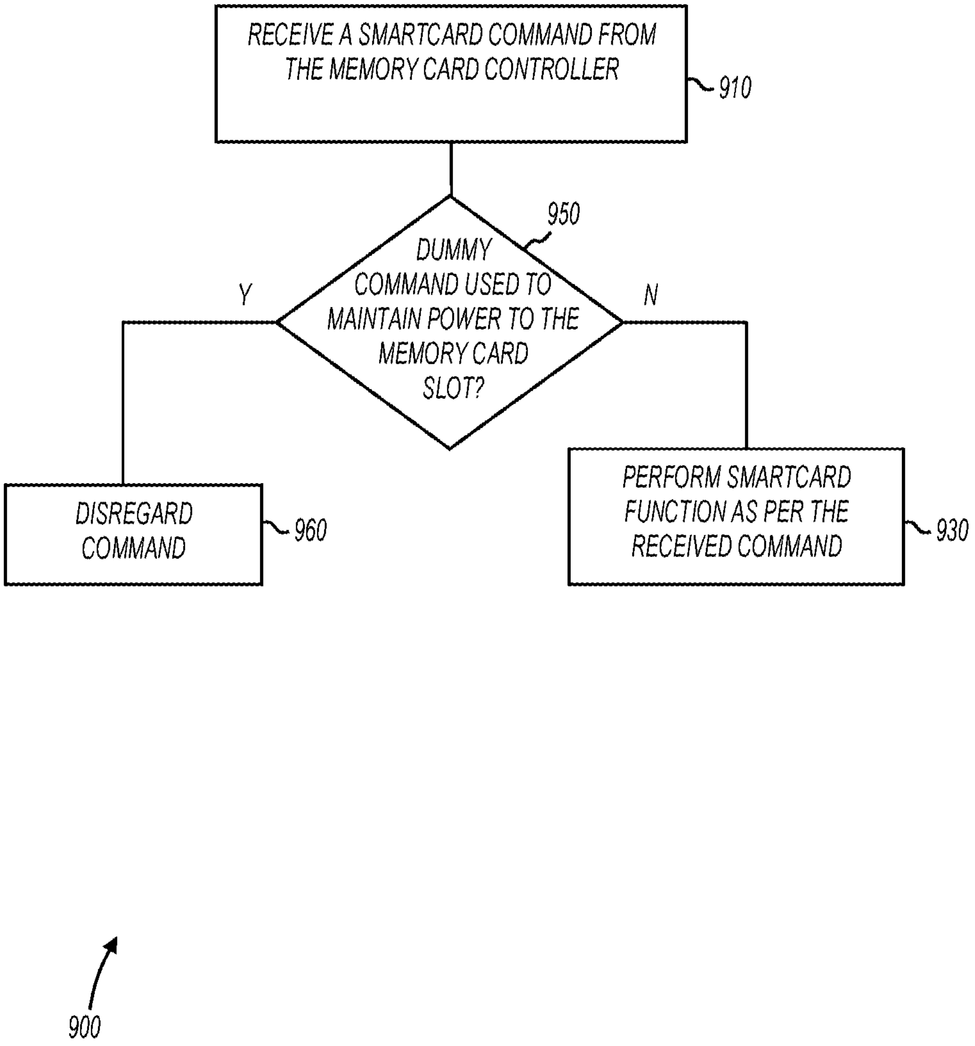

FIG. 9 shows a flowchart in accordance with various embodiments of the present invention. In some embodiments, method 900 may be used by an RFID card in a memory card slot. In some embodiments, method 900, or portions thereof, is performed by a smartcard controller within an RFID card, and in other embodiments, method 900, or portions thereof, is performed by software. The various actions in method 900 may be performed in the order presented, in a different order, or simultaneously. Further, in some embodiments, some actions listed in FIG. 9 are omitted from method 900.

Method 900 begins at 910 in which a smartcard controller receives a command from the memory card controller. This command corresponds to a hidden command received by the memory card controller. At 950, the smartcard controller determines whether the command is a "dummy" command used solely for the purpose of maintaining power to the memory card slot. If no, then the smartcard function specified in the command is performed at 930. If yes, then the command is disregarded at 960.

Method 900 allows a memory card compatible RFID card in a memory card slot to remain powered during periods when the memory card slot in the host device would otherwise remove power to save energy. This is a coordinated effort between software building hidden commands in a memory card access command, the memory card controller diverting the hidden command to the smartcard controller, and the smartcard controller disregarding the command. According to embodiments represented by FIG. 3A, providing power to the RFID card also provides power the smartcard controller, thereby allowing the use of a small inductive device such as those shown in FIGS. 3 and 4.

Figure 10:
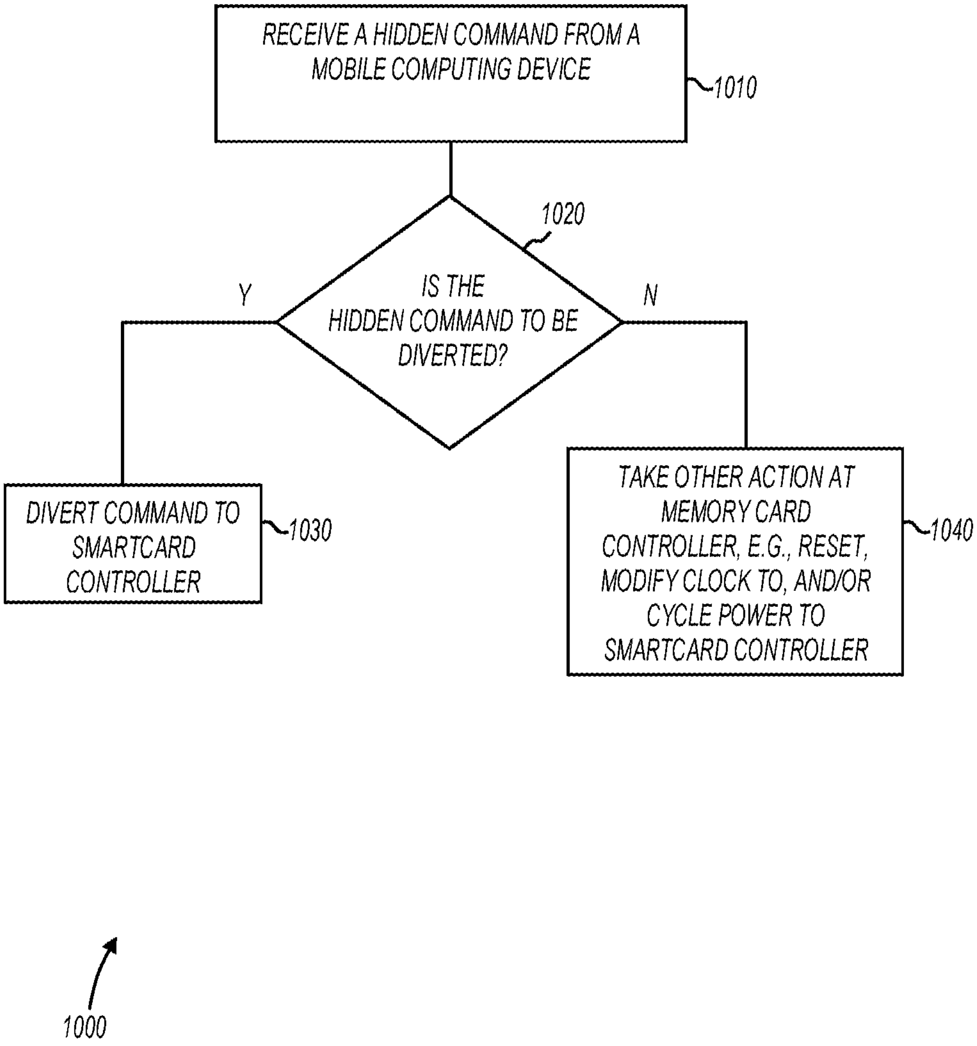

FIG. 10 shows a flowchart in accordance with various embodiments of the present invention. In some embodiments, method 1000 may be used by an RFID card in a memory card slot. In some embodiments, method 1000, or portions thereof, is performed by a memory card controller within an RFID card, and in other embodiments, method 1000, or portions thereof, is performed by software. The various actions in method 1000 may be performed in the order presented, in a different order, or simultaneously. Further, in some embodiments, some actions listed in FIG. 10 are omitted from method 1000.

Method 1000 begins at 1010 in which a memory card controller receives a hidden command from a mobile computing device. If at 1020, the memory card controller determines that the hidden command is to be diverted to the smartcard controller, then the command is diverted at 1030. In some embodiments, this corresponds to sending command index 540 and hidden command related data 550 (FIG. 5) to the smartcard controller. If the command is not to be diverted, then the memory card controller does not divert the command; however, the memory card controller may take other actions at 1040 based on the hidden command. For example, the memory card controller may modify a clock signal provided to the smartcard controller. Also for example, the memory card controller may assert a reset signal to the smartcard controller. Still for example, the memory card controller may cycle power to the smartcard controller. The memory card controller is able to cycle power to the smartcard controller in embodiments represented by FIG. 3B.

Cycling power to the smartcard controller may be a coordinated effort between the hosting computing device and the memory card controller in the RFID card. For example, power to the memory card slot may be maintained by supplying dummy hidden commands to the RFID card as described above with reference to FIG. 9. While power is maintained to the memory card slot, hidden commands may be used to cause the memory card controller to cycle power to the smartcard controller.

Figure 11:
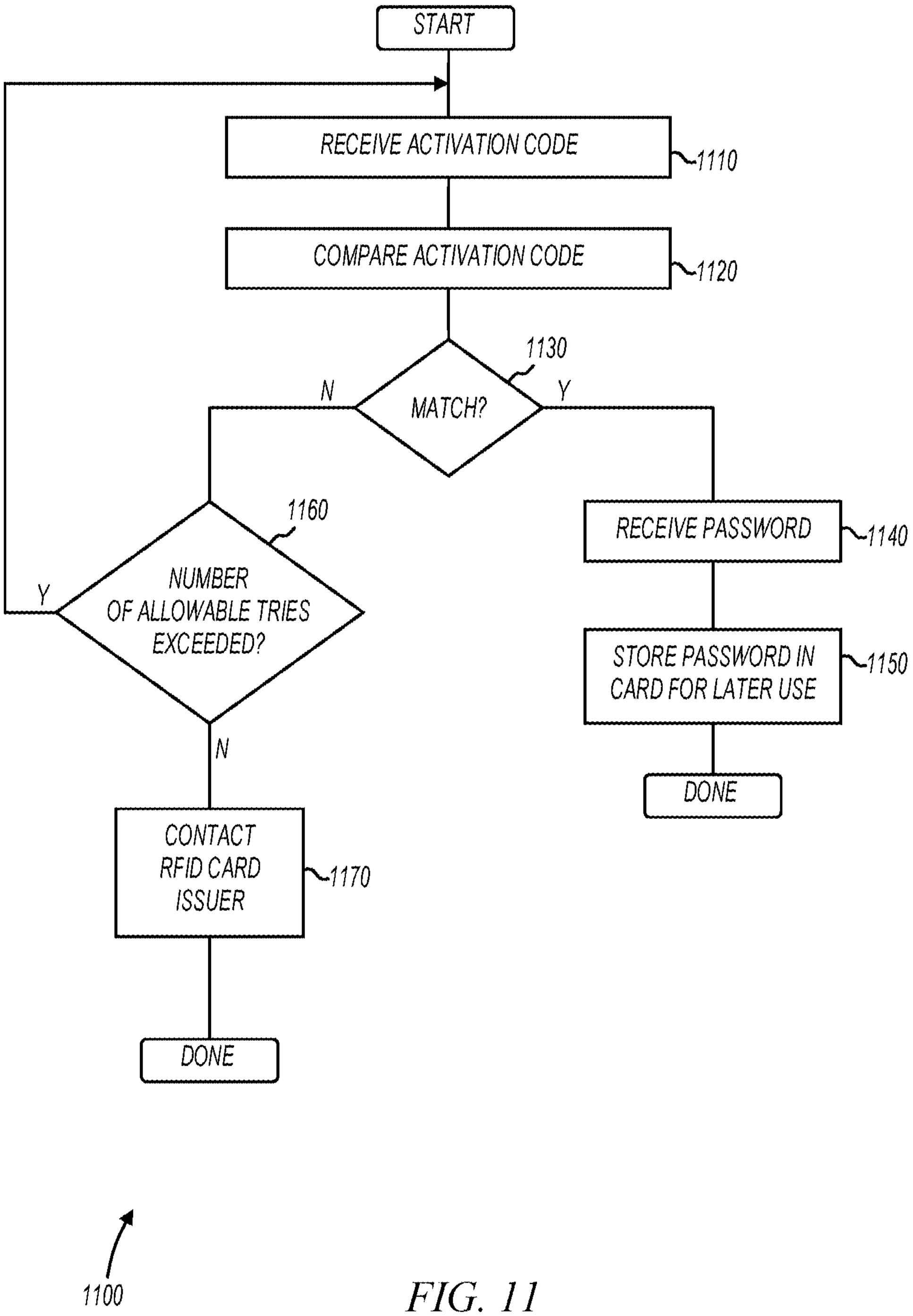
Figure 12:
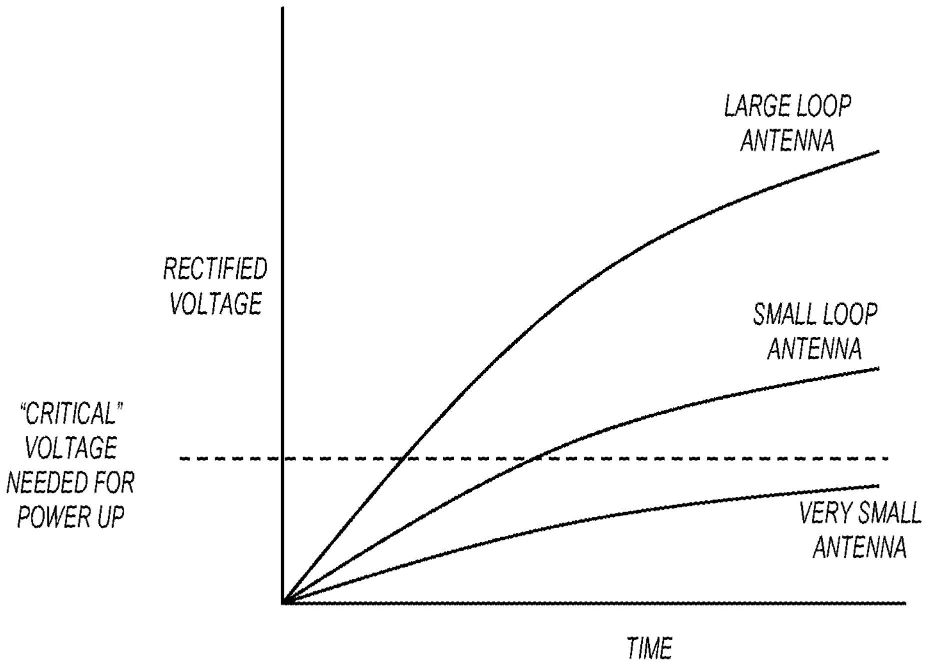
FIG. 12 (PRIOR ART)
FIG. 12 shows a power supply voltage developed over time by rectifying a voltage induced in a loop antenna in the presence of an interrogating RF field.
Figure 13:
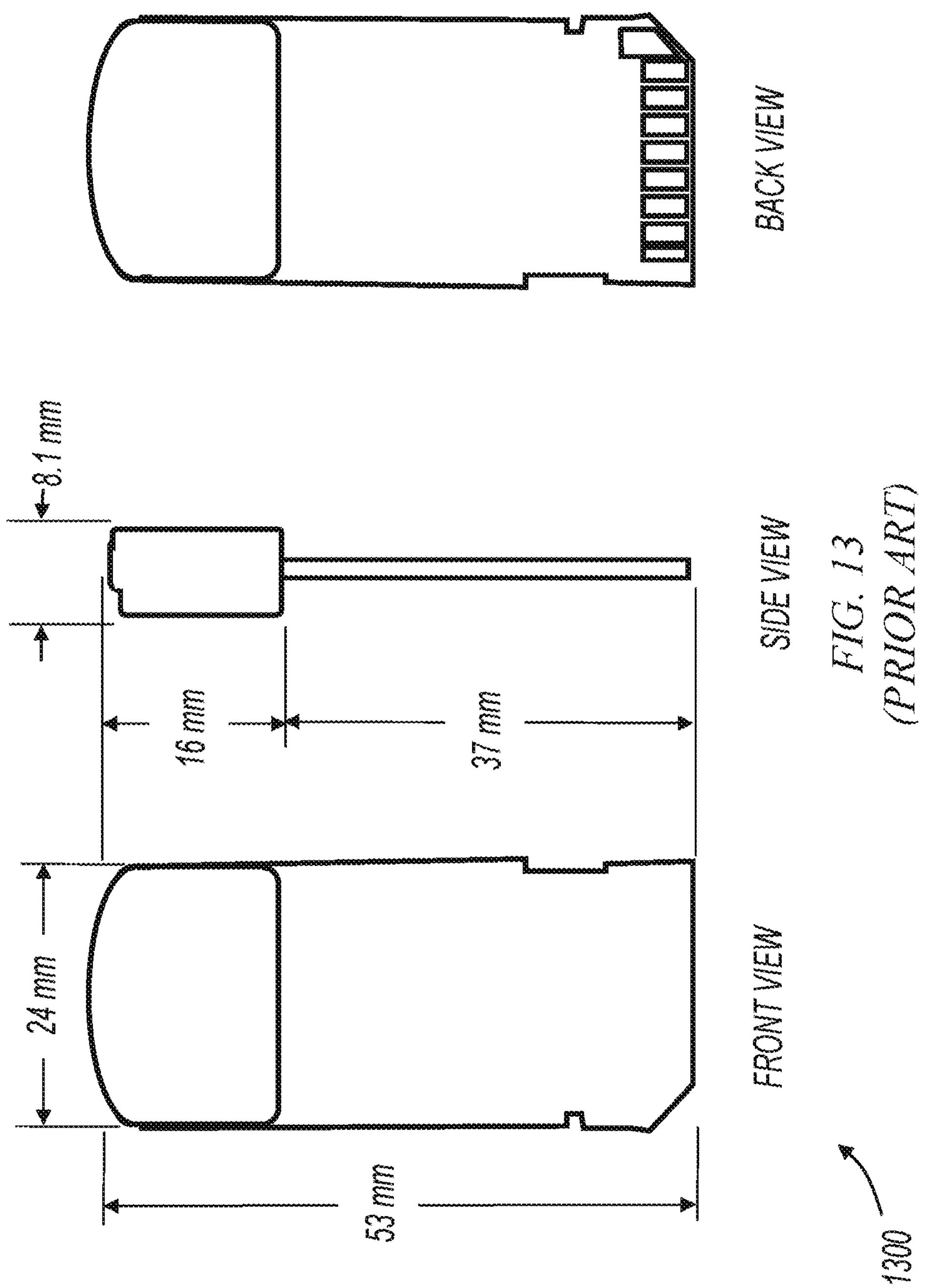
FIG. 13 (PRIOR ART)
FIG. 13 shows a prior art RFID tag implementation in a secure digital (SD) memory card.

FIG. 11 shows a method authenticating a mobile computing device to one or more functions in a memory card compatible RFID card. Method 1100 begins at block 1110 in which an activation code is received at an RFID card from a mobile computing device. At 1120, the received activation code is compared to a code stored in the RFID card. If the activation code matches, the RFID card receives a password from the mobile computing device at 1140, and stores the password in the RFID card for later use at 1150. If the activation code does not match, the RFID card determines whether a number of allowable tries has been exceeded at 1160. If the number of allowable tries has been exceeded, the RFID card issuer is contacted at 1170, and if the number of allowable tries has not been exceeded, the method repeats until either the activation code matches or the number of allowable tries has been exceeded.

Method 1100 may be performed when an RFID card is issued to a user. For example, the RFID card may be a mobile payment card issued by a financial institution. The user may be provided an activation code to "activate" the RFID card. When the user successfully enters the activation code, the user is prompted for a password, and that password is stored for use in future hidden commands.

In some embodiments, multiple non-memory functions in an RFID card are authenticated using method 1100. For example, each of multiple non-memory functions may have stored activation codes, and each is activated separately. Each of the separately activated functions may have a different password, or the multiple functions may share a password.

Embodiments described thus far include a power delivery mechanism from the host to the smartcard controller that allow the antenna or coil to be very small. The small antenna or coil allows for higher levels of integration, but may also reduce the maximum distance at which the RFID card may function. For example, referring to FIG. 14, the voltage produced by the antenna needs to overcome the diode drops of the bridge rectifier before data can be demodulated within the smartcard controller. As the antenna shrinks in size, the RFID card needs to be closer to the device producing the interrogating RF field in order to produce a large enough voltage to overcome the bridge rectifier diode drops, thereby reducing the maximum usable distance.

Figure 15:
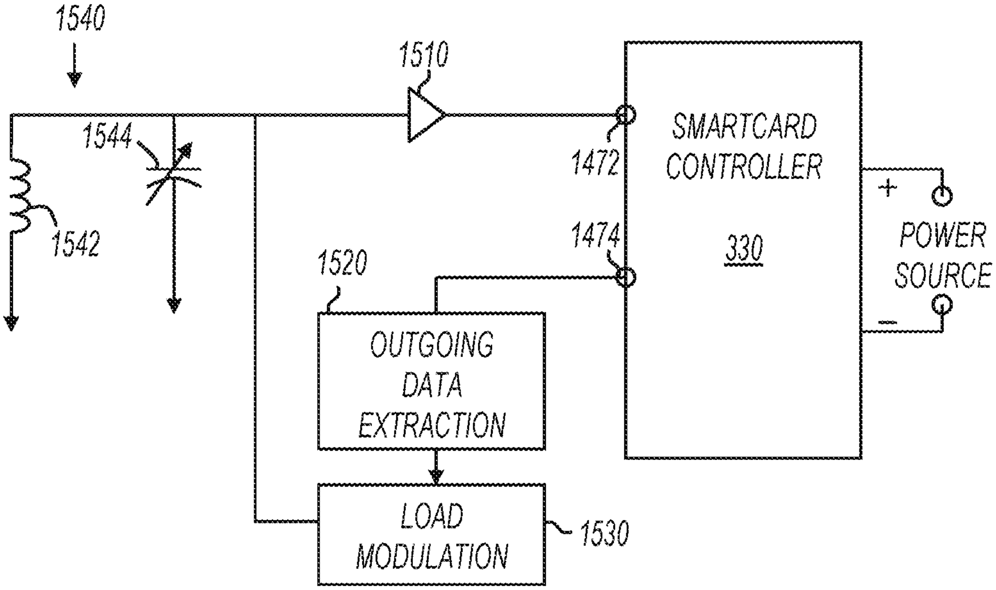
FIG. 15 shows a smartcard controller with performance enhancement circuits including a load modulation driver circuit and an antenna in accordance with various embodiments of the present invention.

FIG. 15 shows a smartcard controller with performance enhancement circuits including a load modulation driver circuit and an antenna in accordance with various embodiments of the present invention. Antenna 1542 is a small inductive element as described above. Capacitor 1544 is in parallel with antenna 1542 and together they form tuned circuit 1540 that is tuned to be resonant at the frequency of operation (e.g., 13.56 MHz). The performance enhancement circuits include an amplifier 1510, outgoing data extraction circuit 1520, and load modulation driver circuit 1530. Amplifier 1510 amplifies the voltage received at antenna 1542, and the amplified voltage is provided to the smartcard controller. This increases the maximum distance at which the RFID card can operate while receiving data, but also creates a unidirectional data path where a bidirectional data path previously existed. In other words, amplifier 1510 forms a simplex communication path where a half duplex path previously existed.

In order to restore the outgoing data path and re-create a half duplex communications system, the RFID card includes outgoing data extraction circuit 1520 and load modulation driver circuits 1530. Outgoing data extraction circuit 1520 receives a signal that is formed by the interrogating RF field having been load modulated by the smartcard controller. For example, the impedance of the antenna port is modulated by load modulation driver circuit 1410 (FIG. 14), where the modulating signal is the data. Outgoing data extraction circuit 1520 recovers the data, and then load modulation driver circuit 1530 modulates the impedance of the tuned circuit 1540 to form the outgoing data path.

Figure 16:
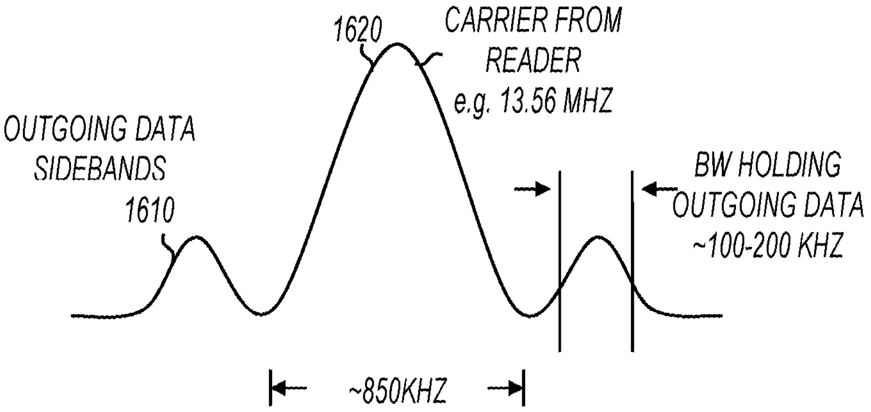
FIG. 16 shows frequency spectrum used in RFID communications.

Outgoing data extraction circuit 1520 may include one or more filters to extract the data. For example, referring now to FIG. 16, the load modulation driver circuit within the smartcard controller creates frequency sidebands 1610 about the carrier frequency 1620 of the interrogating RF field. Outgoing data extraction circuit 1520 may include conventional filters to isolate one or more sidebands and extract the data. As shown in FIG. 16, in some 13.56 MHz embodiments, the bandwidth of the carrier frequency of the interrogating RF field may be on the order of 850 KHz and the bandwidth of the sidebands may be on the order of 100-200 KHz, although this is not a limitation of the present invention.

Load modulation driver circuit 1530 receives the extracted data from outgoing data extraction circuit 1520, and load modulates the tuned circuit 1540 in response thereto. Load modulation driver circuits are generally well known, and may be as simple as a switched transistor that adds and removes a reactive element from tuned circuit 1540. In some embodiments, load modulation driver circuit 1530 substantially duplicates the load modulation driver circuit 1410 within smartcard controller 330.

Amplifier 1510 is shown coupled to smartcard controller pad 1472, and data extraction circuit 1520 is shown coupled to smartcard controller pad 1474, but this is not a limitation of the present invention. For example, outgoing data extraction circuit 1520 may be coupled to smartcard controller pad 1472 while amplifier 1510 may be coupled to smartcard controller pad 1474. Also for example, both circuit 1520 and amplifier 1510 may be coupled to either pad 1472 or pad 1474 without departing from the scope of the present invention.

Figure 17:
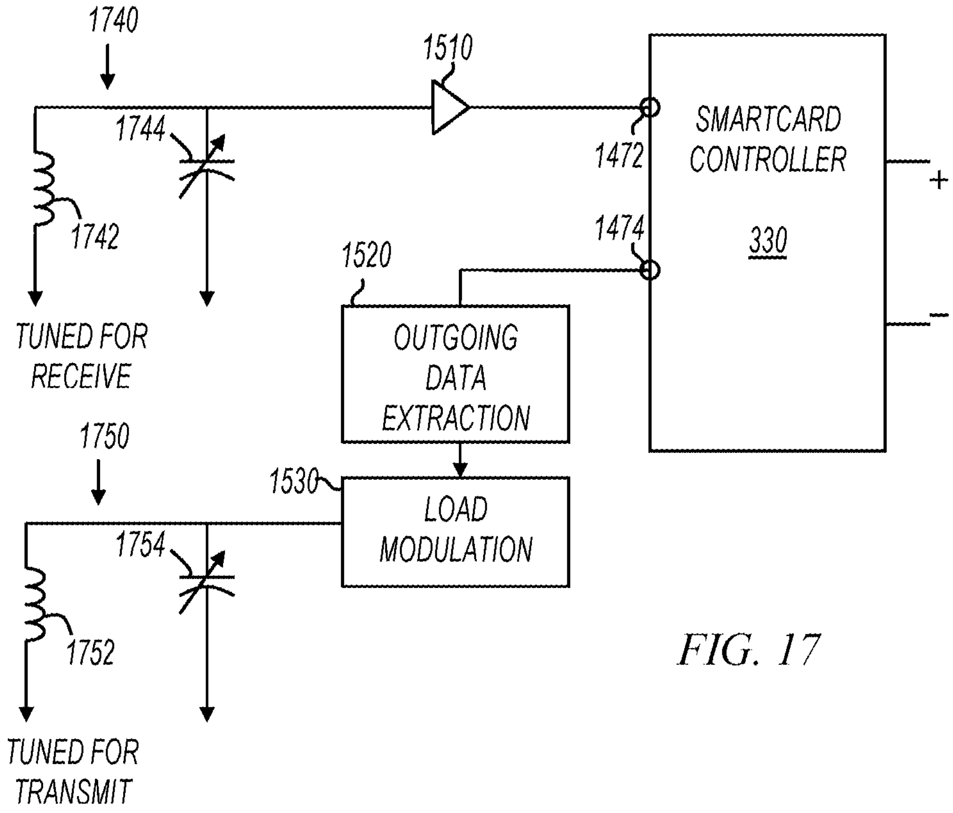
FIG. 17 shows a smartcard controller with performance enhancement circuits including a load modulation driver circuit and separate receive and transmit antennas in accordance with various embodiments of the present invention.

FIG. 17 shows a smartcard controller with performance enhancement circuits including a load modulation driver circuit and separate receive and transmit antennas in accordance with various embodiments of the present invention. FIG. 17 shows smartcard controller 330, amplifier 1510, outgoing data extraction circuit 1520, and load modulation driver circuit 1530, all of which are described above. FIG. 17 also shows tuned circuits 1740 and 1750. Tuned circuit 1740 includes receive antenna 1742 and capacitor 1744. Tuned circuit 1750 includes transmit antenna 1752 and capacitor 1754. In some embodiments, receive antenna 1742 and transmit antenna 1752 are small inductive elements as described above.

Figure 18:
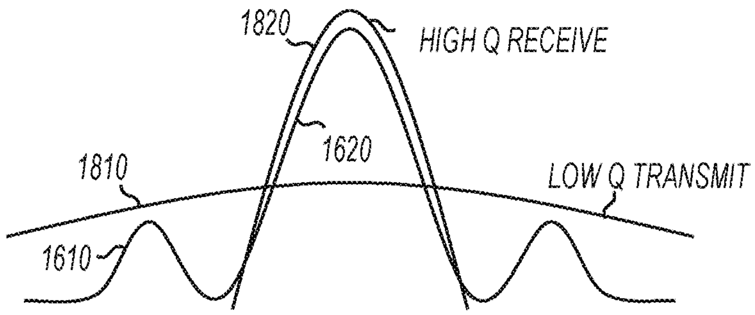
FIG. 18 shows frequency spectrum used in RFID communications.

Separate transmit and receive antennas allow for different tuning, both in frequency and bandwidth, or "Q." For example, tuned circuit 1740 may be tuned with relatively high Q for receive as shown at 1820 in FIG. 18, while tuned circuit 1750 may be tuned for a lower Q to envelope both sidebands for transmit as shown at 1830 in FIG. 18. The higher Q tuning for the receive antenna may further increase the maximum usable distance when the RFID card is receiving.

Figure 19:
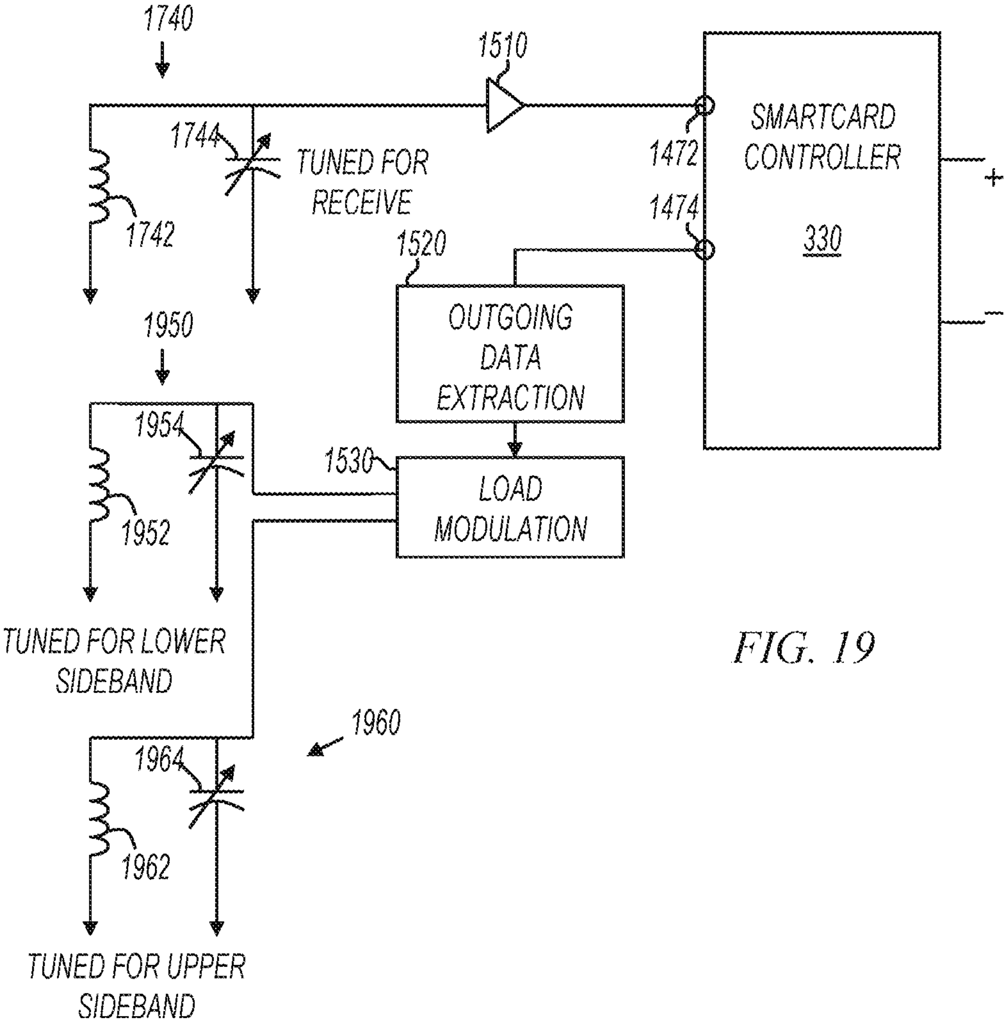
FIG. 19 shows a smartcard controller with performance enhancement circuits including a load modulation driver circuit and multiple transmit antennas in accordance with various embodiments of the present invention.

FIG. 19 shows a smartcard controller with performance enhancement circuits including a load modulation driver circuit and multiple transmit antennas in accordance with various embodiments of the present invention. FIG. 19 shows smartcard controller 330, amplifier 1510, outgoing data extraction circuit 1520, load modulation driver circuit 1530, and tuned receive circuit 1740, all of which are described above. FIG. 19 also shows two tuned transmit circuits 1950 and 1960. Tuned circuit 1950 includes antenna 1952 and capacitor 1954, and tuned circuit 1960 includes antenna 1962 and capacitor 1964. Antennas 1952 and 1962 may be small inductive elements as described above.

Figure 20:
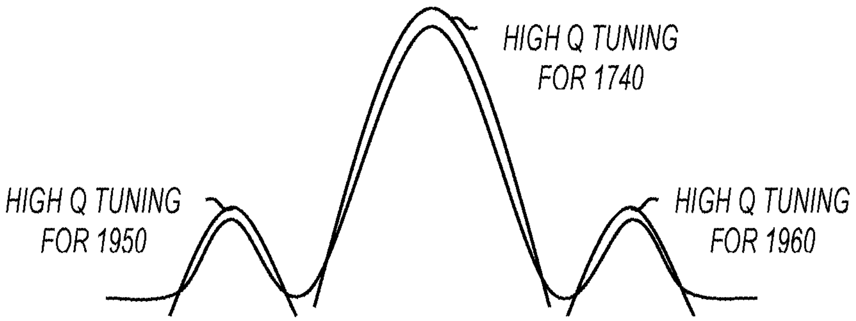
FIG. 20 shows frequency spectrum used in RFID communications.

Separate transmit antennas allow separate tuning for the two sidebands. For example, tuned circuit 1950 may be tuned for the lower sideband tuned circuit 1960 may be tuned for the upper sideband as shown in FIG. 20. Higher Q tuning of the transmit antennas for the separate sidebands may further increase the maximum usable distance when the RFID card is transmitting.

Figure 21:
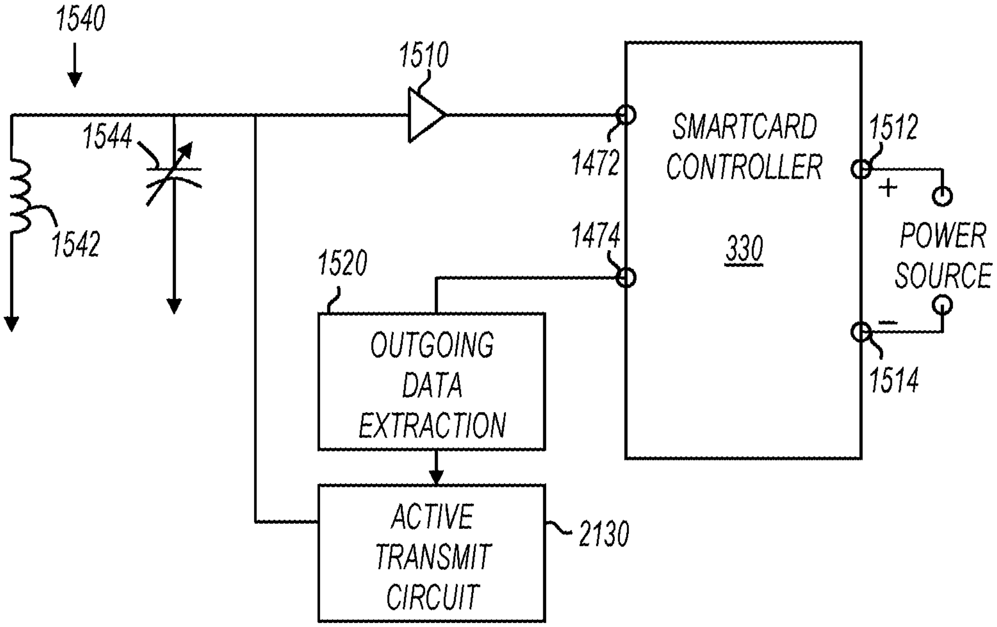
FIG. 21 shows a smartcard controller with performance enhancement circuits including an active transmit driver circuit and an antenna in accordance with various embodiments of the present invention.

FIG. 21 shows a smartcard controller with performance enhancement circuits including an active transmit driver circuit and an antenna in accordance with various embodiments of the present invention. The circuits shown in FIG. 21 are similar to FIG. 15 except the load modulation driver is replaced with an active transmit driver circuit 2130. Active transmit driver circuit 2130 may include circuits to actively transmit a signal rather than simply load modulate tuned circuit 1540. For example, active transmit driver circuit 2130 may include one or more amplifiers, filters, oscillators, modulators, etc., to form a signal that mimics the sidebands 1610 (FIG. 16) as if the interrogating RF field experienced load modulation. Active transmission can make use of power available on the RFID card and can further increase the usable distance when smartcard controller 330 is transmitting.

Figure 22:
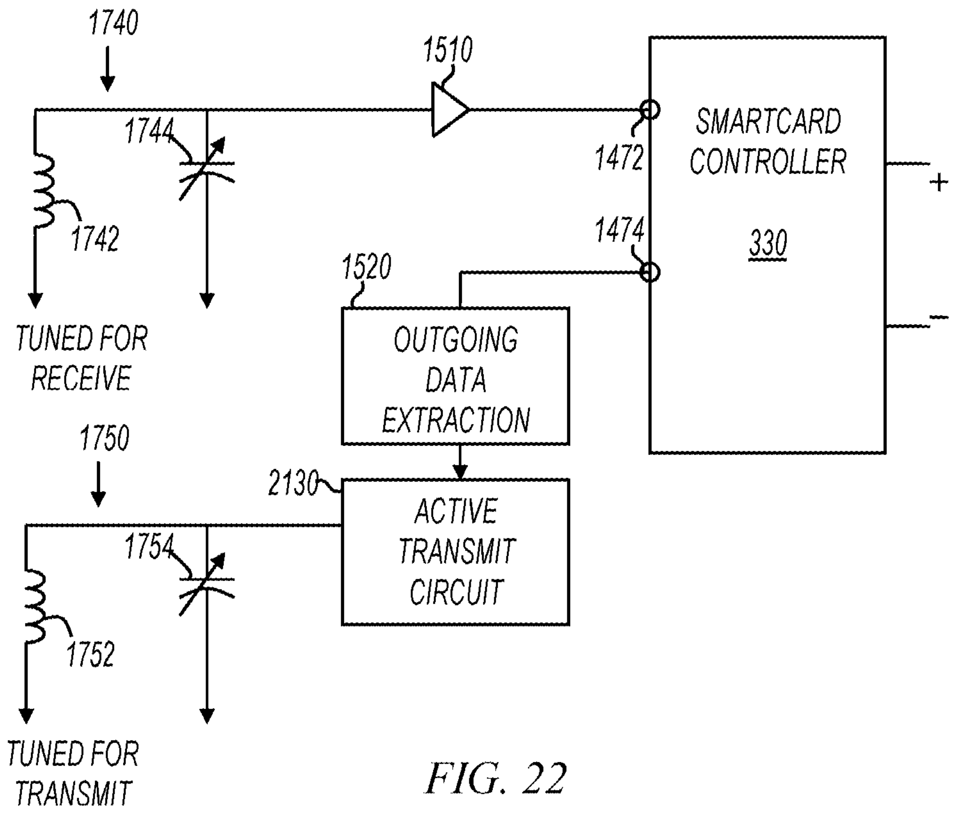
FIG. 22 shows a smartcard controller with performance enhancement circuits including an active transmit driver circuit and separate receive and transmit antennas in accordance with various embodiments of the present invention.

FIG. 22 shows a smartcard controller with performance enhancement circuits including an active transmit driver circuit and separate receive and transmit antennas in accordance with various embodiments of the present invention. The circuits shown in FIG. 22 are similar to FIG. 17 except the load modulation driver is replaced with an active transmit driver circuit 2130. Active transmit driver circuit 2130 is described above with reference to FIG. 21.

Figure 23:
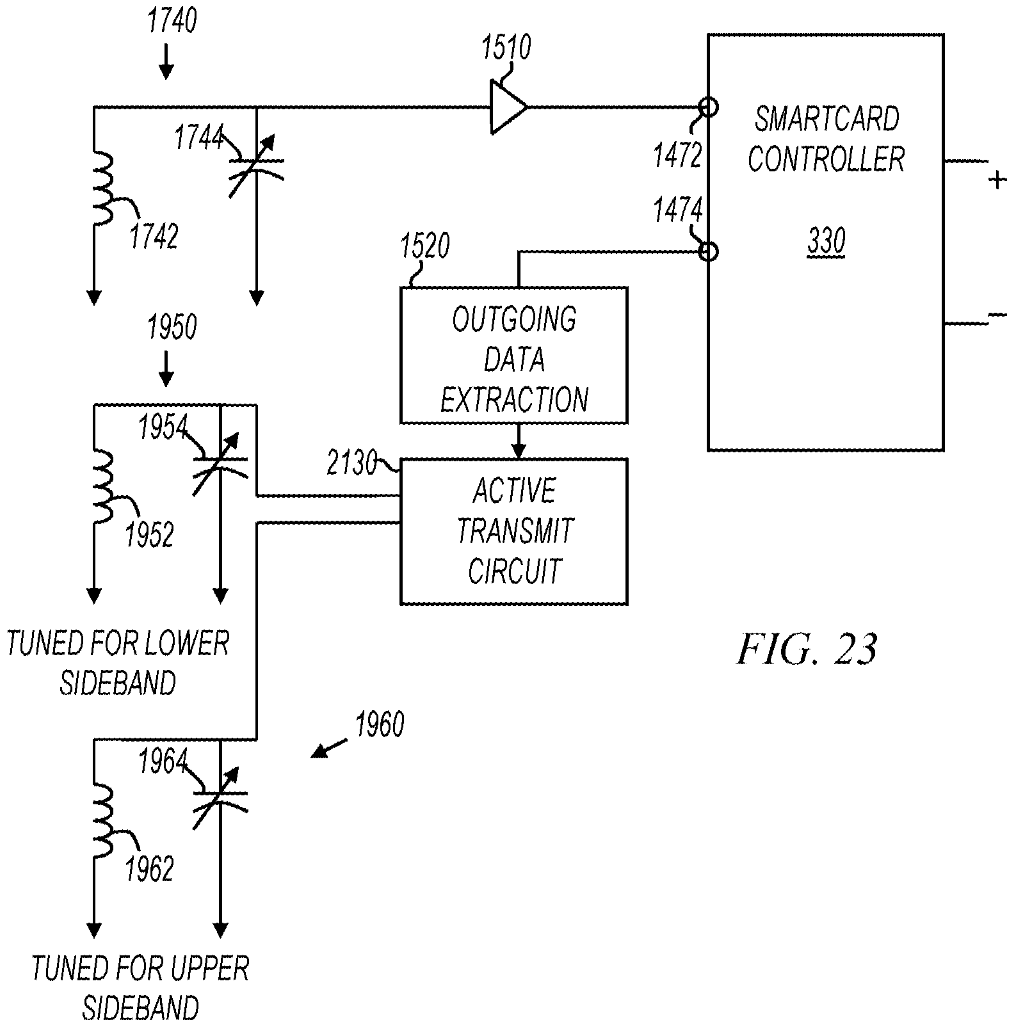
FIG. 23 shows a smartcard controller with performance enhancement circuits including an active transmit driver circuit and multiple transmit antennas in accordance with various embodiments of the present invention.

FIG. 23 shows a smartcard controller with performance enhancement circuits including an active transmit driver circuit and multiple transmit antennas in accordance with various embodiments of the present invention. The circuits shown in FIG. 23 are similar to FIG. 19 except the load modulation driver is replaced with an active transmit driver circuit 2130. Active transmit driver circuit 2130 is described above with reference to FIG. 21.

Figure 24:
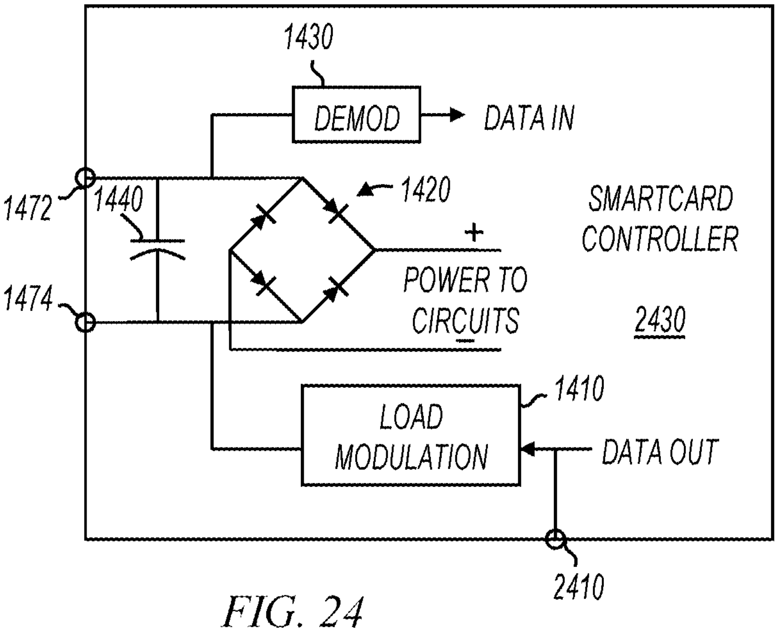
FIG. 24 shows a smartcard controller with a pad to provide digital data output.

FIG. 24 shows a smartcard controller with a pad to provide a digital data output. Smartcard controller 2430 includes the antenna pads 1472 and 1474 as described above. Smartcard controller 2430 also includes pad 2410 which provides the digital data output directly. By providing the digital data output directly, smartcard controller 2430 enables various embodiments of the invention to eliminate the outgoing data extraction circuit.

Figure 25:
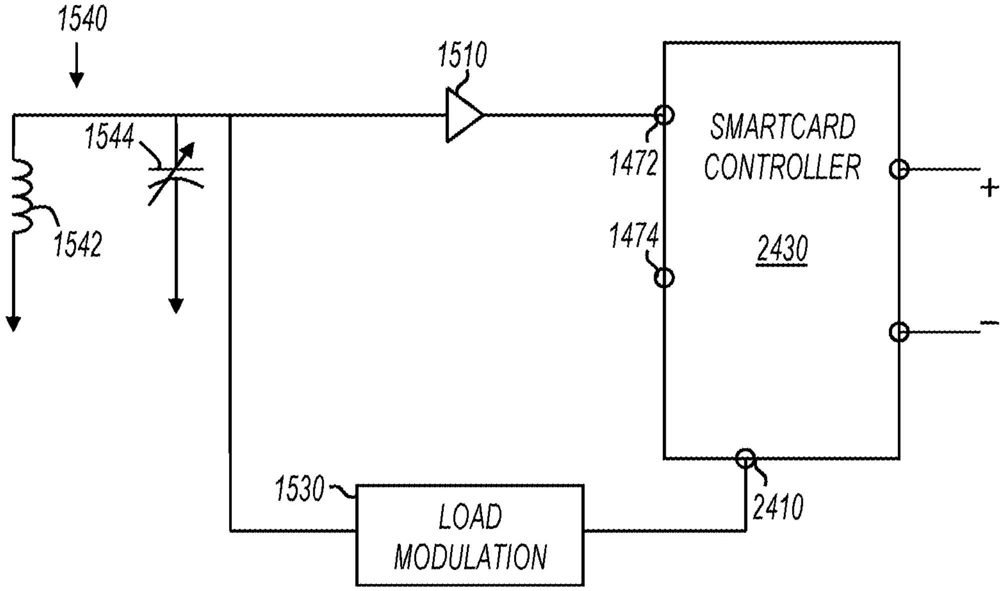
FIG. 25 shows a smartcard controller with digital data output and performance enhancement circuits including a load modulation driver circuit and an antenna in accordance with various embodiments of the present invention.

FIG. 25 shows a smartcard controller with digital data output and performance enhancement circuits including a load modulation driver circuit and an antenna in accordance with various embodiments of the present invention. FIG. 25 shows smartcard controller 2430, amplifier 1510, load modulation driver circuits 1530, and tuned circuit 1540, all of which are described above. Note that because smartcard controller 2430 provides digital data directly, the outgoing data extraction circuit 1520 (FIG. 15) can be omitted, thereby reducing parts count and cost.

Figure 26:
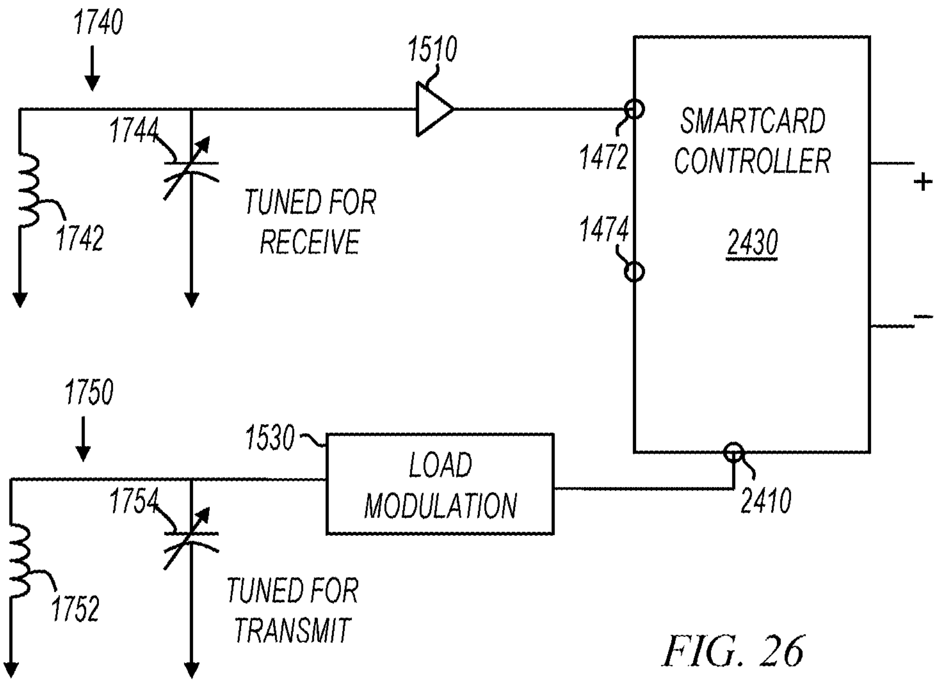
FIG. 26 shows a smartcard controller with digital data output and performance enhancement circuits including a load modulation driver circuit and separate receive and transmit antennas in accordance with various embodiments of the present invention.

FIG. 26 shows a smartcard controller with digital data output and performance enhancement circuits including a load modulation driver circuit and separate receive and transmit antennas in accordance with various embodiments of the present invention. FIG. 26 shows circuits similar to those shown in FIG. 25, except that separate transmit and receive antennas are provided. Separate transmit and receive antennas (and associated tuned circuits) allow for a higher Q tuning of the receive antenna, thereby increasing the maximum usable distance when RFID card is receiving. See FIG. 18.

Figure 27:
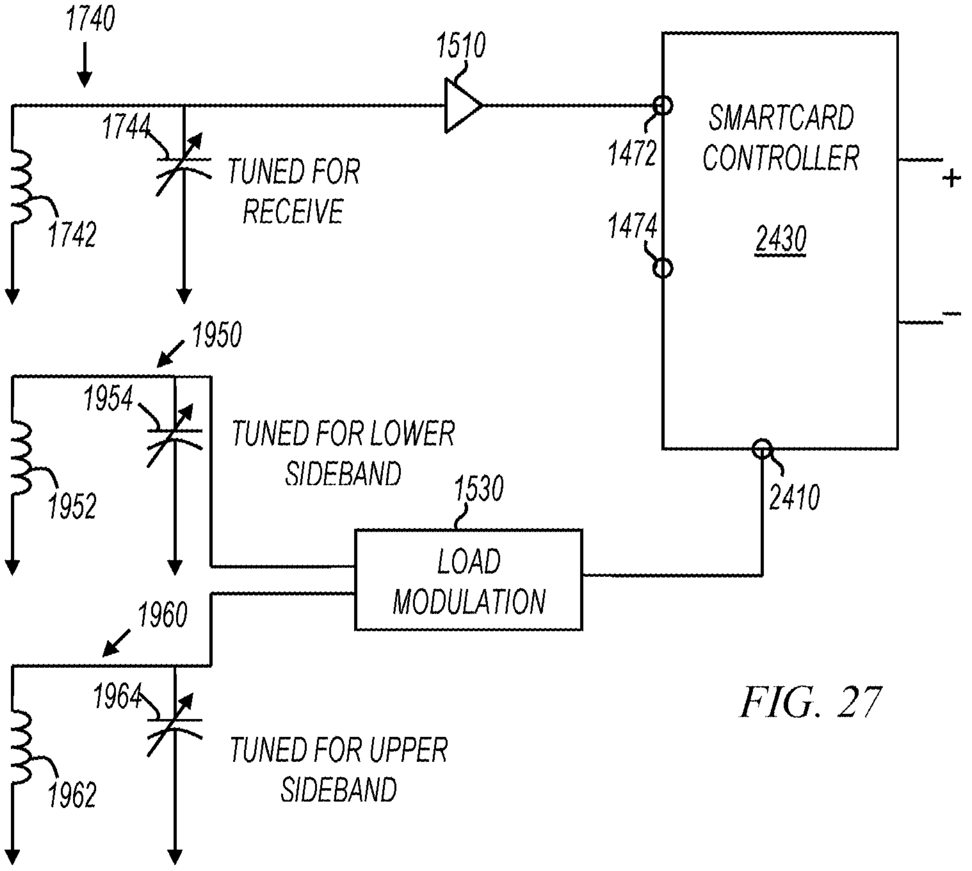
FIG. 27 shows a smartcard controller with digital data output and performance enhancement circuits including a load modulation driver circuit and multiple transmit antennas in accordance with various embodiments of the present invention.

FIG. 27 shows a smartcard controller with digital data output and performance enhancement circuits including a load modulation driver circuit and multiple transmit antennas in accordance with various embodiments of the present invention. FIG. 27 shows circuits similar to those shown in FIG. 26, except that multiple transmit antennas are provided. Multiple separate transmit antennas (and associated tuned circuits) allow for a higher Q tuning of each transmit antenna, thereby increasing the maximum usable distance when RFID card is transmitting. Sec FIG. 20.

Figure 28:
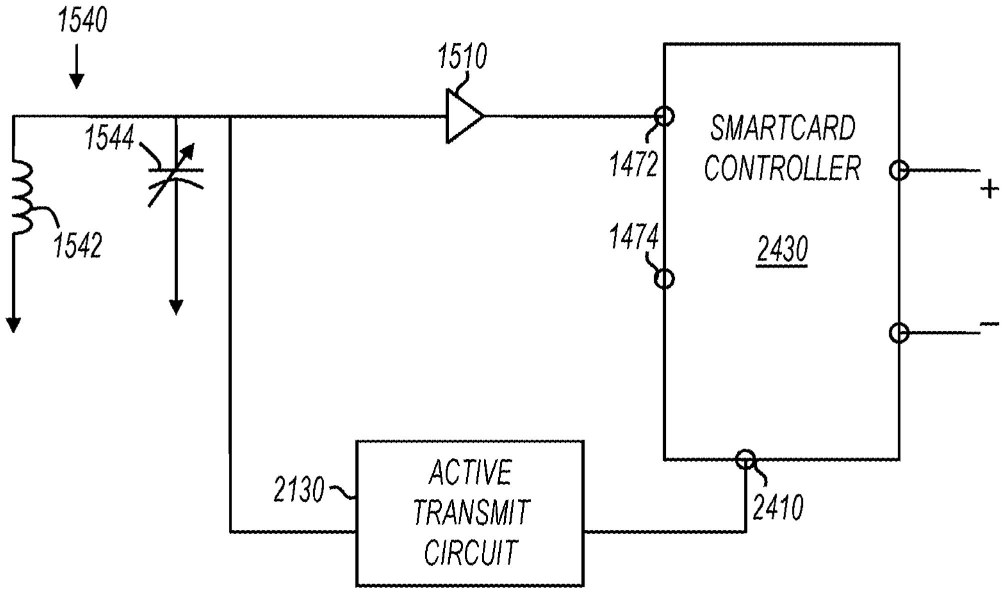
FIG. 28 shows a smartcard controller with digital data output and performance enhancement circuits including an active transmit driver circuit and an antenna in accordance with various embodiments of the present invention.

FIG. 28 shows a smartcard controller with digital data output and performance enhancement circuits including an active transmit driver circuit and a single antenna in accordance with various embodiments of the present invention. The circuits shown in FIG. 28 are similar to FIG. 25 except the load modulation driver is replaced with an active transmit driver circuit 2130. Active transmit driver circuit 2130 is described above with reference to FIG. 21. In general, the term "driver" as used herein refers to an active transmit driver or a load modulation driver or any other method of driving the transmit output data.

Figure 29:
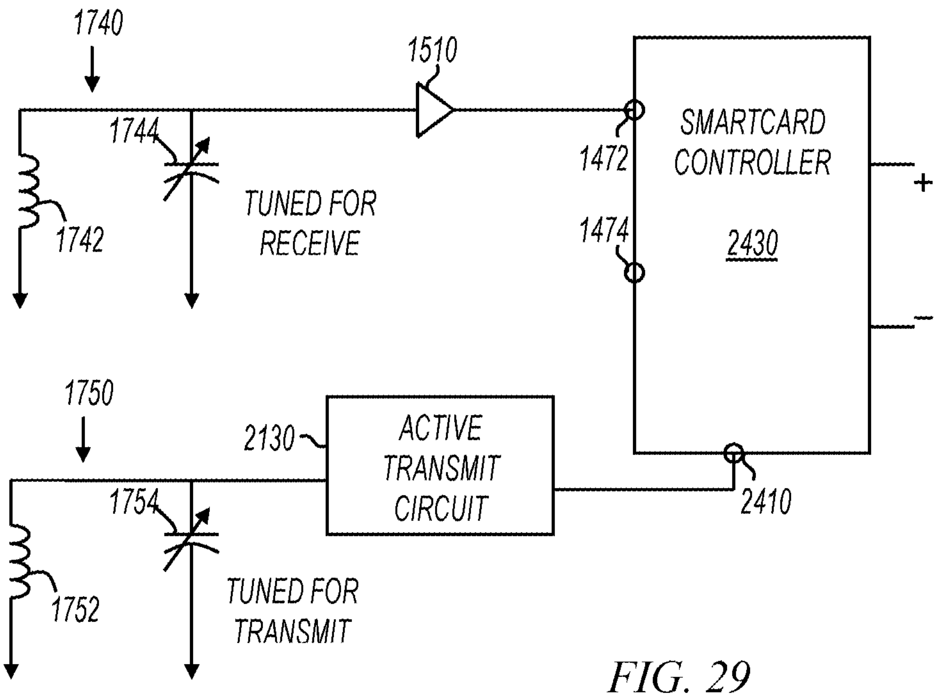
FIG. 29 shows a smartcard controller with digital data output and performance enhancement circuits including an active transmit driver circuit and separate receive and transmit antennas in accordance with various embodiments of the present invention.

FIG. 29 shows a smartcard controller with digital data output and performance enhancement circuits including an active transmit driver circuit and separate receive and transmit antennas in accordance with various embodiments of the present invention. The circuits shown in FIG. 29 are similar to FIG. 26 except the load modulation driver is replaced with an active transmit driver circuit 2130. Active transmit driver circuit 2130 is described above with reference to FIG. 21.

Figure 30:
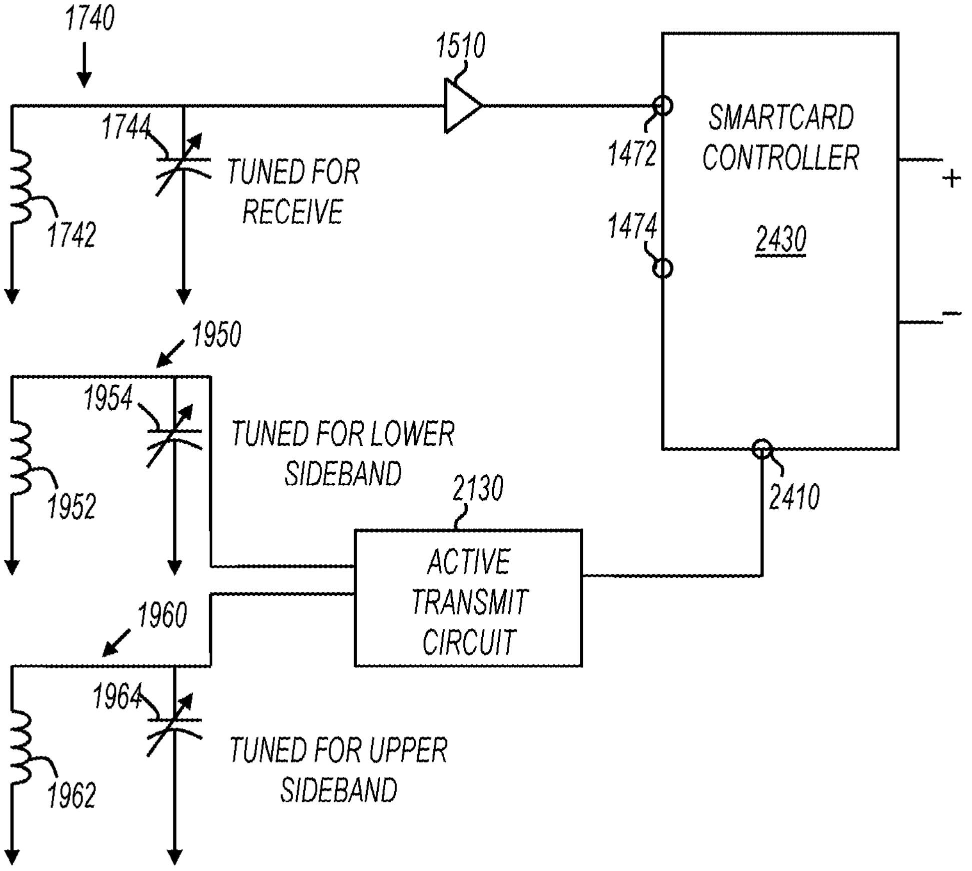
FIG. 30 shows a smartcard controller with digital data output and performance enhancement circuits including an active transmit driver circuit and multiple transmit antennas in accordance with various embodiments of the present invention.

FIG. 30 shows a smartcard controller with digital data output and performance enhancement circuits including an active transmit driver circuit and multiple transmit antennas in accordance with various embodiments of the present invention. The circuits shown in FIG. 30 are similar to FIG. 27 except the load modulation driver is replaced with an active transmit driver circuit 2130. Active transmit driver circuit 2130 is described above with reference to FIG. 21.

Figure 31:
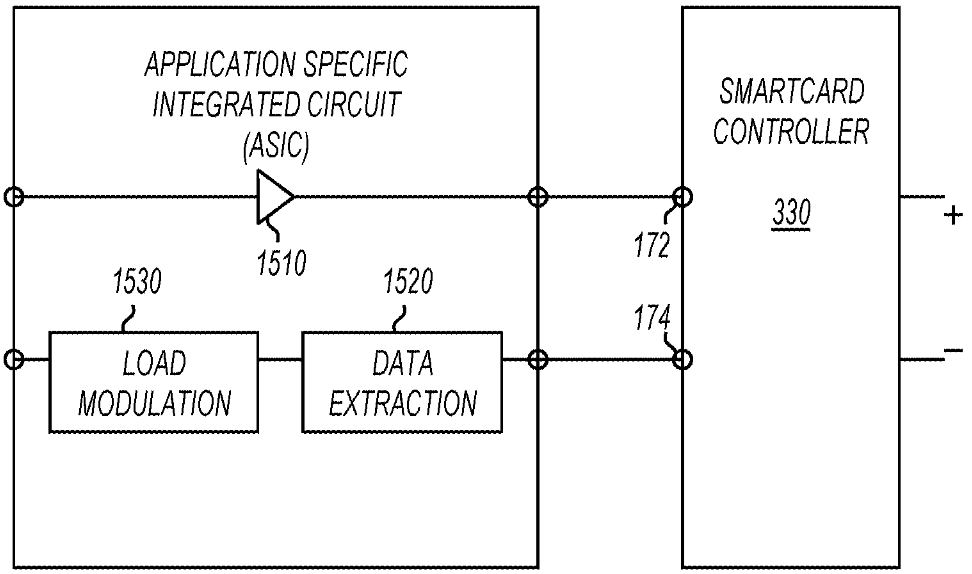
FIGS. 31-34 show performance enhancing application specific integrated circuits (ASICs) coupled to various smartcard controllers in accordance with various embodiments of the present invention.
Figure 32:
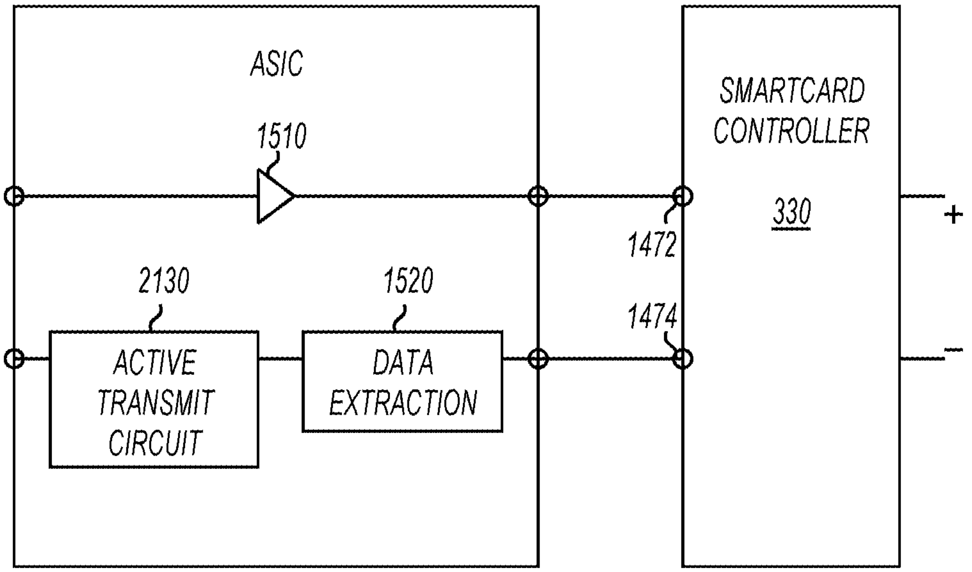
Figure 33:
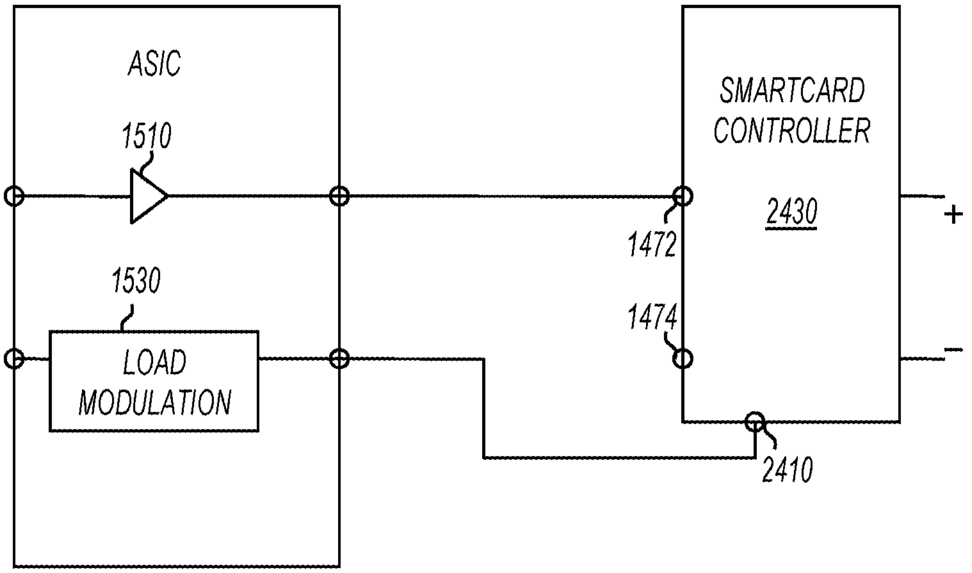
Figure 34:
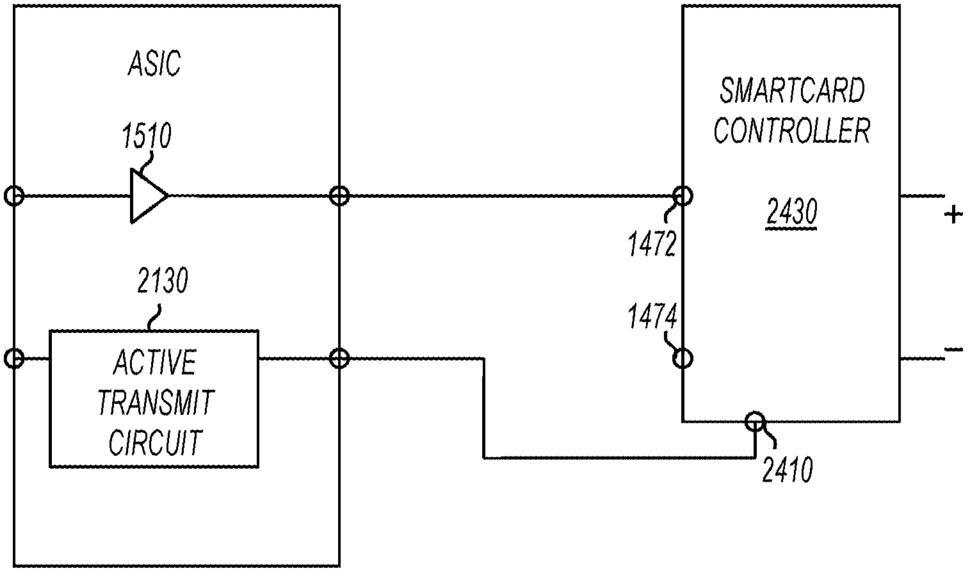

FIGS. 31-34 show performance enhancing application specific integrated circuits (ASICs) coupled to various smartcard controllers in accordance with various embodiments of the present invention. FIGS. 31 and 32 show ASICs coupled to smartcard controller 330. Both ASICs include amplifier 1510 and outgoing data extraction circuits 1520. The ASIC of FIG. 31 includes load modulation driver circuits 1530 and the ASIC of FIG. 32 includes active transmit driver circuit 2130. FIGS. 33 and 34 show ASICs coupled to receive direct digital data from smartcard controller 2430. Accordingly, the outgoing data extraction circuits are omitted. The ASIC of FIG. 33 includes amplifier 1510 and load modulation driver circuits 1530, and the ASIC of FIG. 34 includes amplifier 1510 and active transmit driver circuit 2130.

By combining a smartcard controller and an ASIC as described herein, the performance of an RFID card may be enhanced with a reduced parts count. Further, any of ASICs shown may be used with separate receive and transmit antennas, multiple transmit antennas, or any combination. Further, one ASIC may be provided with all of the functionality shown in FIGS. 31-34 and the manner in which it is connected to a smartcard controller may dictate which functional blocks (e.g., data extraction, load modulation, active transmit) are utilized.

Figure 35:
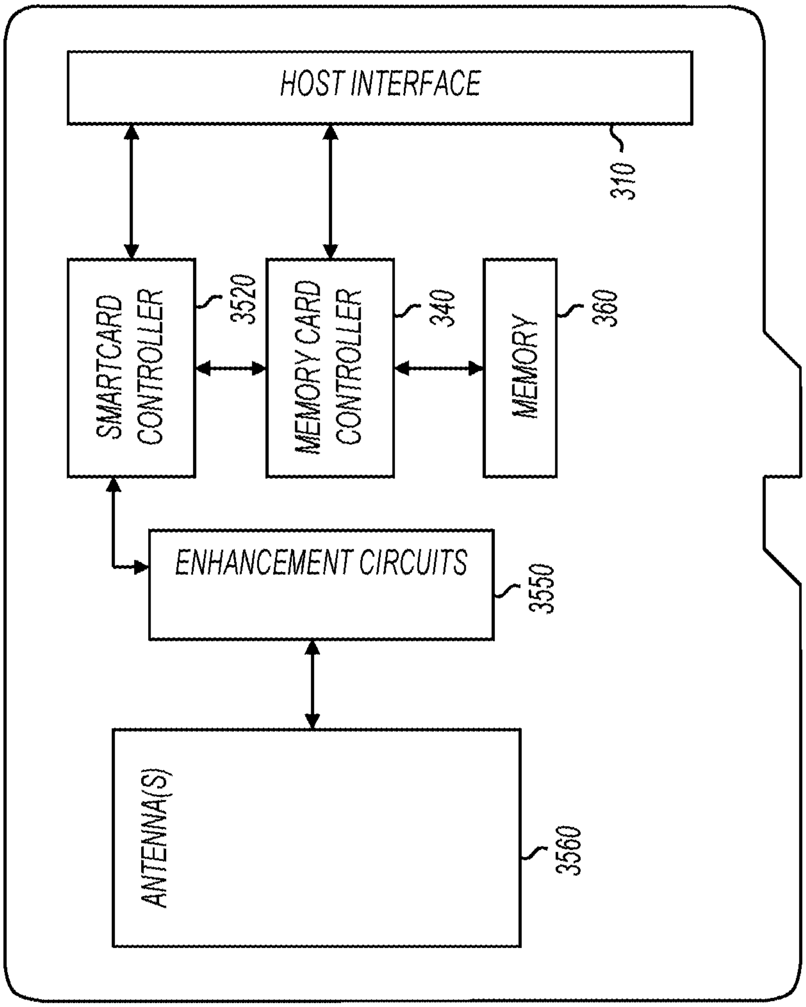
FIG. 35 shows a memory card with integrated smartcard controller, performance enhancement circuits and antennas in accordance with various embodiments of the present invention.

FIG. 35 shows a memory card with integrated smartcard controller, performance enhancement circuits, and antennas in accordance with various embodiments of the present invention. Host interface 310, memory card controller 340, and memory 360 are described above. Smartcard controller 3520 may be any smartcard controller described herein, including smartcard controller 330 or smartcard controller 2430. Enhancement circuits 3550 may include any of the enhancement circuits described herein including any combination of amplifier 1510, outgoing data extraction circuits 1520, load modulation driver circuits 1530, and active transmit driver circuit 2130. Antenna(s) 3560 may include any number or type of antennas. For example, antenna(s) 3560 may include one antenna, separate transmit and receive antennas, or a receive antenna and multiple transmit antennas.

Figure 36:
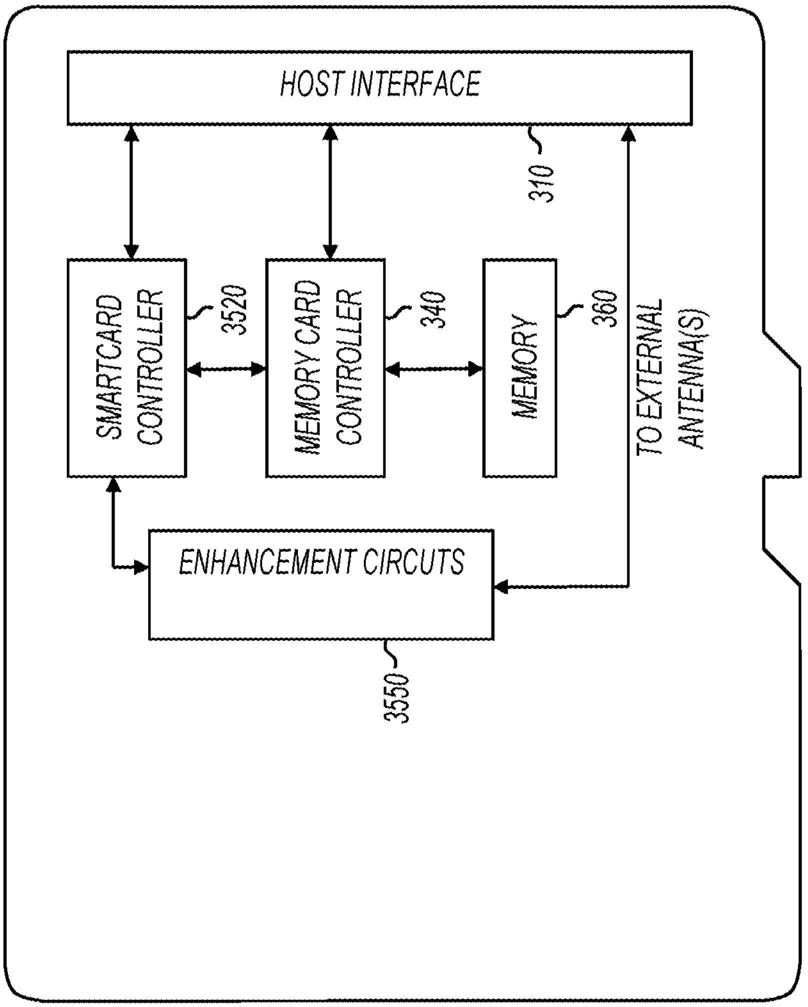
FIG. 36 shows a memory card with integrated smartcard controller and performance enhancement circuits in accordance with various embodiments of the present invention.

FIG. 36 shows a memory card with integrated smartcard controller and performance enhancement circuits in accordance with various embodiments of the present invention. The memory card of FIG. 36 shows circuits similar to FIG. 35 with the exception of antenna(s) 3560. Instead, the memory card of FIG. 36 is intended for use with a host device that includes antenna(s). In some embodiments, antenna(s) 3560 are included in the memory card of FIG. 36, thereby allowing the host device to decide whether to use the antennas on the memory card, or the antennas on the host device. The form factor of the memory card in FIGS. 35 and 36 is shown as a microSD card, but this is not a limitation of the present invention. Any form factor may be employed.

Figure 37:
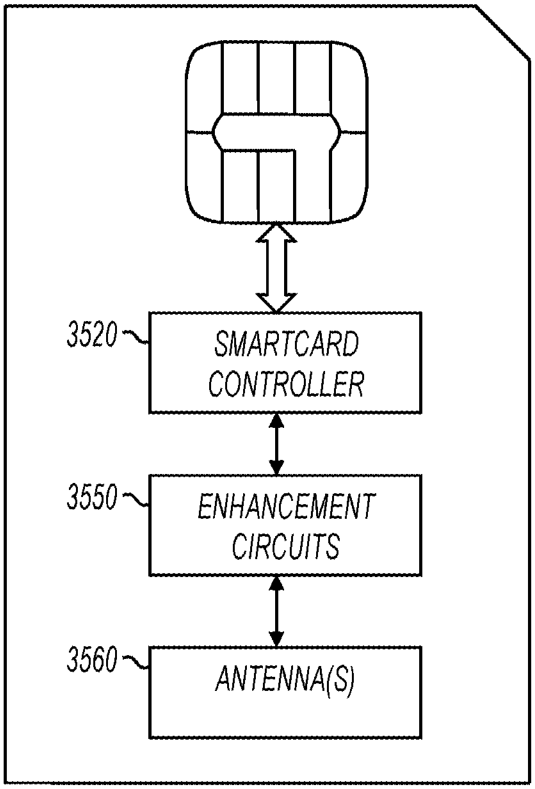
FIG. 37 shows a subscriber identity module (SIM) card with integrated smartcard controller, performance enhancement circuits and antennas in accordance with various embodiments of the present invention.

FIG. 37 shows a subscriber identity module (SIM) card with integrated smartcard controller, performance enhancement circuits and antennas in accordance with various embodiments of the present invention. Smartcard controller 3520, enhancement circuits 3550, and antenna(s) 3560 are described above with reference to FIG. 35.

Figure 38:
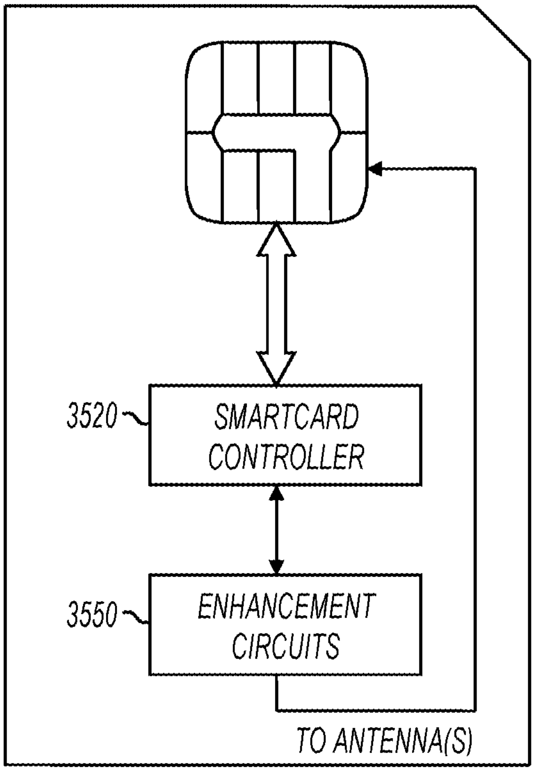
FIG. 38 shows a subscriber identity module (SIM) card with integrated smartcard controller and performance enhancement circuits in accordance with various embodiments of the present invention.

FIG. 38 shows a subscriber identity module (SIM) card with integrated smartcard controller and performance enhancement circuits in accordance with various embodiments of the present invention. The SIM card of FIG. 38 shows circuits similar to FIG. 37 with the exception of antenna(s) 3560. Instead, the SIM card of FIG. 38 is intended for use with a host device that includes antenna(s). In some embodiments, antenna(s) 3560 are included in the SIM card of FIG. 38, thereby allowing the host device to decide whether to use the antennas on the SIM card, or the antennas on the host device.

Figure 39:
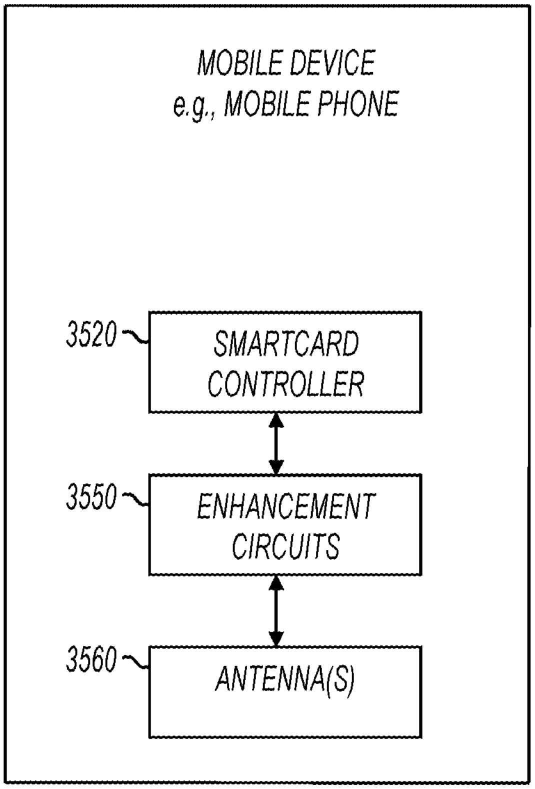
FIG. 39 shows a mobile device with a smartcard controller, enhancement circuits, and antenna(s).

FIG. 39 shows a mobile device with a smartcard controller, enhancement circuits, and antenna(s). The mobile device of FIG. 39 includes a built-in smartcard controller for RFID functionality as opposed to accepting a separate RFID card as described above. The mobile device may be any electronic device including a mobile phone, a tablet computer, or the like.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

We claim:

1. An apparatus comprising:

means for receiving at least one of data pattern or an address from an RFID card; and means for populating the data pattern or the address into a command to cause the command to be diverted to a smartcard controller on the RFID card.

2. The apparatus of claim 1, wherein the command is a memory card access command.

3. The apparatus of claim 1, wherein the means for populating the data pattern comprises means for writing to a data field as a hidden command data value.

4. The apparatus of claim 1, wherein the means for populating the address comprises means for populating an address field of the command with an address value, and wherein the address value is associated with the address.

5. The apparatus of claim 1 further comprises means for populating a data field of the command with a command string to specify a purpose other than memory card access.

6. The apparatus of claim 1 further comprises means for populating a data field of the command with a password to authenticate access to the RFID card.

7. The apparatus of claim 1 further comprises means for sending the command to the RFID card.

8. The apparatus of claim 1, wherein the RFID card is positioned in a memory card slot.

9. An apparatus comprising:

a receiver to receive at least one of data pattern or an address from a card; and a circuitry coupled to the receiver, wherein the circuitry is to populate the data pattern or the address into a command to cause the command to be diverted to a smartcard controller on the card; and a transmitter to send the command to the card.

10. The apparatus of claim 9, wherein the card comprises an RFID.

11. The apparatus of claim 9, wherein the command is a memory card access command.

12. The apparatus of claim 9, wherein the circuitry is to write to a data field as a hidden command data value to populate the data pattern.

13. The apparatus of claim 9, wherein the circuitry is to populate an address field of the command with an address value to populate the address, and wherein the address value is associated with the address.

14. The apparatus of claim 9, wherein the circuitry is to populate a data field of the command with a command string to specify a purpose other than memory card access.

15. The apparatus of claim 9, wherein the circuitry is to populate a data field of the command with a password to authenticate access to the card.

16. The apparatus of claim 9, wherein the card is positioned in a memory card slot.

17. An apparatus comprising:

a receiver to receive at least one of data pattern or an address from a card; and a circuitry coupled to the receiver, wherein the circuitry is to populate the data pattern or the address into a memory card access command to cause the memory card access command to be diverted to a smartcard controller on the card; and a transmitter to send the memory card access command to the card.

18. The apparatus of claim 17, wherein the card comprises an RIFD.

19. The apparatus of claim 17, wherein the circuitry is to populate a data field of the memory card access command with a password to authenticate access to the card.

* * * * *